US006934724B1

(12) United States Patent
Deshayes et al.

(10) Patent No.: US 6,934,724 B1
(45) Date of Patent: Aug. 23, 2005

(54) METHODS AND APPARATUS FOR REDUCING RESOURCE CONTENTION IN PARALLEL DATA BACKUP PROCESSES

(75) Inventors: John G. Deshayes, Hopkinton, MA (US); Anand Pillai, Norwood, MA (US); Neil Schutzman, Marlborough, MA (US); Brian A. Barnhart, Westborough, MA (US); Alison Peacock, Arlington, VA (US); Sudheer Arora, New York, NY (US)

(73) Assignee: EMC Corporation, Hopkinton, MA (US)

( * ) Notice: Subject to any disclaimer, the term of this patent is extended or adjusted under 35 U.S.C. 154(b) by 651 days.

(21) Appl. No.: 09/747,179

(22) Filed: Dec. 21, 2000

(51) Int. Cl.[7] .............................................. G06F 17/30
(52) U.S. Cl. ...................... 707/204; 707/201; 709/248
(58) Field of Search ................................ 707/204, 202, 707/8, 201, 1, 10; 711/162; 395/182.13, 395/180; 709/100, 104, 200; 718/100, 102; 714/1, 162

(56) References Cited

U.S. PATENT DOCUMENTS 5,673,381 A * 9/1997 Huai et al. ..................... 714/1

5,924,097 A * 7/1999 Hill et al. ...................... 707/10

* cited by examiner

*Primary Examiner*—Charles Rones
*Assistant Examiner*—Jacob F. Betit
(74) *Attorney, Agent, or Firm*—Robert Kevin Perkins; Leanne J. Fitzgerald; John M. Gunther

(57) ABSTRACT

Methods and apparatus for reducing resource contention in parallel data backup processes that share a variety of resources in a computer environment to access target data to be backed-up. The target data is distributed among the backup processes based on an availability of one or more resources in the computer environment used by a backup storage system to access the target data. In one example, each data file of the target data is assigned to a particular backup process based on the availability of one or more resources and a total size of the target data. The data files of the target data are assigned to the backup processes such that each backup process backs-up a respective portion of the target data, and such that the collection of backup processes that make up a backup operation are completed in a shortened time as a result of reduced resource contention. The target data originally may be located, for example, in one or more host computer systems, one or more primary storage systems, other computer devices containing a storage medium, or combinations thereof.

24 Claims, 13 Drawing Sheets

| SEGMENT/DURATION | SPINDLE (R1) ID | DISC CONTROLLER (R2) ID | FRONT END CONTROLLER (R3) ID |
|---|---|---|---|
| S1/10ms | 2 | 3 | 1 |
| S2/20ms | 6 | 2 | 2 |
| S3/D3 | | | |
| S4/D4 | | | |
| ... | | | |
| SM/DM | | | |

FIG. 8

| TIME t(ms) | SPINDLE ID (R1) | DISC CONTROLLER ID (R2) | FRONT END ID (R3) |
|---|---|---|---|
| 0 | | | |
| $D_1$ | | | |
| $D_1 + D_2$ | | | |
| $D_1 + D_2 + D_3$ | | | |
| · | | | |
| · | | | |
| · | | | |
| $D_{M-2} + D_{M-1} + D_M$ | | | |

FIG. 9

| BACKUP PROCESS (BP) | TOTAL SPINDLE (R1) PENALTY | TOTAL DA (R2) PENALTY | TOTAL FRONT END (R3) PENALTY |
|---|---|---|---|
| 1 | | | |
| 2 | | | |
| 3 | | | |
| ... | ... | ... | ... |
| N | | | |

FIG. 10

| FILE NAME | BACKUP PROCESS | ORDER IN PROCESS |
|---|---|---|
| F<sub>LARGEST</sub> | | |
| ... | ... | ... |
| F<sub>SMALLEST</sub> | | |

METHODS AND APPARATUS FOR REDUCING RESOURCE CONTENTION IN PARALLEL DATA BACKUP PROCESSES

FIELD OF THE INVENTION

The present invention relates to data storage for computers, and more particularly, to methods and apparatus for optimizing data backup processes.

DISCUSSION OF THE RELATED ART

Virtually all computer applications rely on some form of data storage. The term "data" generally refers to any information, including formatting information, computer code (executable programs), and other information that may be manipulated and/or utilized by an executable program. Accordingly, data storage systems generally can be used, for example, for storing computer code, a variety of variables and other information, and particular arrangements and organizations of data, such as databases.

In a variety of computer environments, a backup data storage system may be desirable in addition to a primary data storage system. Generally, a backup data storage system provides redundant data storage and archiving to permit recovery of data in the event of, for example, corruption of the data in the primary storage system, failure of the primary storage system, and the like.

FIG. 1 illustrates one example of a conventional computer environment 200 including a computer system 10, a primary storage system 12, and a backup storage system 14. In FIG. 1, the computer system 10 is coupled to the backup storage system 14 via line 18. The line 18 may represent one or more direct connections dedicated exclusively to transmitting information between the computer system 10 and the backup storage system 14. Alternatively, the line 18 may represent a non-dedicated connection, such as an open network connection (as indicated by the dashed arrows in FIG. 1), which can be used for other purposes. For example, when the line 18 is a network connection, it may also be connected to one or more other computer systems similar to the computer system 10, or other network devices (not shown). In a network environment, the computer system 10 may be configured as a conventional network computer system.

In FIG. 1, the primary storage system 12 may be any type of storage system that includes one or more storage devices employing a storage media, such as magnetic or optical disks, magnetic tape, and the like. Additionally, the primary storage system may include a processor and one or more controllers to manage writing data to, and reading data from, the storage media. While the primary storage system 12 is directly connected to the computer system 10 in FIG. 1, the primary storage system 12 alternatively may be coupled to the computer system 10 via a network (e.g., via the line 18 serving as a network connection or via a different network). One example of a storage system suitable for use as the primary storage system 12 in FIG. 1 is the SYMMETRIX line of disk arrays, available from EMC Corporation of Hopkinton, Mass.

The backup storage system 14 of FIG. 1 may include one or more backup storage devices (e.g., disk drives, tape storage, or any other storage media), together with one or more processors and/or controllers for storing data on the backup storage media and recovering the data from the backup storage media. An example of a backup storage system suitable for use as the backup storage system 14 is the EMC® Data Manager (EDM), also available from EMC Corporation, of Hopkinton, Mass.

The EDM backup system is a turnkey product designed to manage and store large amounts of backup data. In particular, the EDM backup system is capable of providing unattended offline or online backup of one or more network client computer systems. For example, in computer environments such as that shown in FIG. 1 in which the line 18 represents a network connection, an EDM backup system may act as a backup server to one or more client computer systems (such as the computer system 10) coupled to the network. The EDM backup system is a fully integrated package that includes all required hardware (e.g., a host processor, controllers, user interface components, etc.), and software for storage media management and backup system operation. In addition to UNIX™ environments, the EDM backup system fully supports, for example, OS/2™, NetWare™, Windows NT™ and other operating systems, and is capable of performing database backup and restore operations for vendors such as Oracle™, Sybase®, Informix™, and Microsoft SQL™.

As shown in FIG. 1, the backup storage system 14 typically is coupled to (or includes) a user interface 22. The user interface 22 may include, for example, a keyboard, keypad and/or mouse, a display which is capable of displaying text and/or graphics, and a printer. The user interface 22 may be integrated as part of the hardware and software package of the backup storage system 14. Alternatively, some or all of the components constituting the user interface may be discrete components coupled to the backup storage system 14.

Through the user interface 22, a user (e.g., a system operator or administrator) may initiate and/or schedule backup activities by instructing the backup storage system to backup particular target data files at particular times (or, for example, periodically). Additionally, through the user interface, the user may access information related to backup activities performed by the backup storage system 14. For example, via the user interface 22, a user may access (e.g., display or print) information indicating the success or failure of completed backup data storage operations performed by the backup storage system 14 on one or more computer systems 10 coupled thereto. Information related to the backup activities of the backup storage system 14 typically is maintained in a portion of the storage area of the backup storage system.

As also shown in the computer environment of FIG. 1, the backup storage system 14 optionally may be directly connected to the primary storage system 12 via one or more dedicated lines 20 (e.g., an EDM backup system may be connected directly to a SYMMETRIX storage system via one or more dedicated lines 20). For situations in which the line 18 represents a network connection, one or more dedicated lines 20 connecting the backup storage system 14 to the primary storage system 12 may improve performance when backing-up and restoring large amounts of data (e.g., large databases) by avoiding the transfer of data over the network.

FIG. 2 is a more detailed illustration of a portion of FIG. 1, showing the primary storage system 12 connected to the backup storage system 14 via the one or more dedicated lines 20. FIG. 2 shows that a number of parallel backup processes $24_1$–$24_N$ may execute to backup to the backup storage system 14, via the one or more lines 20, target data 26 that is stored in the primary storage system 12. Each backup process $24_1$–$24_N$ generally backs-up a respective portion of the target data 26 to one or more storage media 28 of the backup storage system 14.

In FIG. 2, the backup processes $24_1$–$24_N$ are shown as dashed lines, and the one or more dedicated lines 20 are shown for purposes of illustration as a conduit between the primary storage system 12 and the backup storage system 14, to clarify that each backup process $24_1$–$24_N$ represents a flow of data and not necessarily a particular discrete physical connection. More specifically, it should be appreciated that the number of backup processes $24_1$–$24_N$ employed in the configuration of FIG. 2 is not necessarily related to the number of dedicated lines 20 interconnecting the primary storage system 12 and the backup storage system 14. For purposes of the present discussion, each backup process $24_1$–$24_N$ merely requires some physical path between the primary storage system 12 and the backup storage system 14, and a particular physical path for a backup process may involve different ones of the dedicated lines 20 at different times. It is also possible that different backup processes may utilize one or more common dedicated lines at different times during a backup operation of the target data.

In FIG. 2, it should also be appreciated that the block representations of the target data 26 and the backup storage medium or media 28 are shown for purposes of illustration only. In particular, the target data 26 may be located entirely on one storage medium in the primary storage system 12, or may be distributed amongst different storage media in the primary storage system 12. Similarly, the backup processes $24_1$–$24_N$ may backup the target data 26 entirely to one backup storage medium 28 in the backup storage system 14, or may distribute the backed-up target data amongst different backup storage media 28 in the backup storage system 14.

In the data storage configuration of FIG. 2, typically a user specifies (e.g., via the user interface 22) the target data 26 to be backed up (e.g., by identifying one or more data files) and specifies the number of parallel backup processes $24_1$–$24_N$ that the backup storage system 14 employs to backup the target data 26. In general, employing a greater number of parallel backup processes $24_1$–$24_N$ tends to decrease the time required to backup the target data 26. The number of backup processes that may be specified by a user theoretically is unlimited, but practically may be constrained by the particular design of the backup storage system (e.g., software and/or hardware architecture).

Typically, in conventional implementations, the backup storage system 14 of FIG. 2 obtains information regarding a total size of the target data 26 to be backed up from the primary storage system 12, and assigns different portions of the target data 26 to respective backup processes $24_1$–$24_N$ such that the target data is distributed essentially equally amongst the backup processes (i.e., each backup process backs-up approximately the same amount of data). In particular, a desired size (e.g., in bytes) of the data to be backed-up by each process $24_1$–$24_N$ generally is determined from the total size of the target data 26 to be backed up divided by the number of backup processes specified by the user. For example, if the total size of the target data is ten gigabytes and ten backup processes are specified, each backup process backs-up approximately one gigabyte of data. Generally, a given data file of the target data 26 is not broken up amongst different backup processes. Accordingly, in the above example, each backup process may not backup exactly one gigabyte of data, as the distribution of whole data files amongst the ten backup processes may result in slightly different data sizes amongst the backup processes. In any case, it should be appreciated from the foregoing description that, in the conventional data storage configuration shown in FIG. 2, generally the total size of the target data and the number of backup processes used to backup the target data are the factors that determine how the target data is distributed amongst the backup processes.

FIG. 3 is a diagram showing a more detailed example of one possible component configuration for the primary data storage system 12 shown in FIGS. 1 and 2. The configuration shown in FIG. 3 is similar to that of the SYMMETRIX storage systems, discussed above. As shown in FIG. 3, the one or more dedicated lines 20 between the backup storage system 14 and the primary storage system 12 may be coupled to the primary storage system via one or more front end controllers $40_1$–$40_N$. Each front end controller controls communication and data transfer to and from the primary storage system 12 according to any one of a variety of communication protocols. For example, any one of the front end controllers $40_1$–$40_N$ may be a fiber channel adapter or a SCSI (Small Component System Interconnect) adapter employing SCSI communication protocol.

As shown in FIG. 3, the primary storage system 12 may include a number of front end controllers $40_1$–$40_N$, and each front end controller may include a number of physically distinct communication ports to which communication lines (e.g., the dedicated lines 20 or network connections) respectively are connected. For example, FIG. 3 shows that a first front end controller $40_1$ accommodates two dedicated lines and a second front end controller $40_2$ accommodates four dedicated lines. Other front end controllers of the primary storage system 12 may accommodate different numbers of dedicated lines.

FIG. 3 also shows that the primary storage system 12 may include one or more storage devices $46_1$–$46_N$, shown for purposes of illustration in FIG. 3 as disk drives, or "disk drives." It should be appreciated that other types of storage devices may be suitable for use in the primary storage system 12, as discussed above. Additionally, it should be appreciated that while five storage devices are shown in FIG. 3, the primary storage system 12 may include any number of storage devices $46_1$–$46_N$.

The primary storage system 12 of FIG. 3 also includes one or more storage medium controllers $44_1$–$44_N$ to control writing and reading of data to and from the one or more storage devices. In FIG. 3, the storage medium controllers are shown for purposes of illustration as disk controllers, wherein each disk controller is coupled to one or more disk drives. FIG. 3 also shows that the disk controllers $44_1$–$44_N$ and the front end controllers $40_1$–$40_N$ are coupled to a cache memory 42 that stores currently active data being written to or read from the primary storage system 12.

In the primary storage system 12 of FIG. 3, a particular data file may be stored entirely on one of the disk drives $46_1$–$46_N$. Alternatively, a data file may include a number of segments, wherein some of the segments may be stored on one disk drive while other segments are stored on one or more other disk drives. Stated differently, one data file may include a number of segments stored in a dispersed manner amongst a number of disk drives of the primary storage system 12.

In the example of the primary storage system 12 shown in FIG. 3, there is not necessarily a one-to-one correspondence between the disk controllers $44_1$–$44_N$ and the front end controllers $40_1$–$40_N$, and the primary storage system 12 may include different numbers of disk controllers and front end controllers. Additionally, the primary storage system 12 may be configured such that two or more disk controllers are associated with a particular front end controller, while other front end controllers are associated with only one disk controller.

SUMMARY OF THE INVENTION

One embodiment of the invention is directed to an apparatus in a computer environment including at least one data storage area and at least one backup data storage system coupled to the at least one data storage area. The backup storage system is configured to execute at least two backup processes in parallel to backup target data stored in the at least one storage area, wherein each backup process backs up a respective portion of the target data. The apparatus comprises at least one contention controller, coupled to the backup storage system, that distributes the respective portions of the target data among the at least two backup processes based, at least in part, on an availability of at least one resource in the computer environment used by the backup storage system to access the target data.

Another embodiment of the invention is directed to an apparatus in a computer environment including at least one data storage area and at least one backup data storage system coupled to the at least one data storage area. The backup storage system is configured to execute at least two backup processes in parallel to backup target data stored in the storage area. Each backup process backs up a respective portion of the target data. The apparatus comprises means, coupled to the at least one backup storage system, for distributing the respective portions of the target data among the at least two backup processes based, at least in part, on an availability of at least one resource in the computer environment used by the at least one backup storage system to access the target data.

Another embodiment of the invention is directed to a method in a computer environment including at least one data storage area and at least one backup data storage system coupled to the at least one data storage area. The backup storage system is configured to execute at least two backup processes in parallel to backup target data stored in the storage area. Each backup process backs up a respective portion of the target data. The method comprises an act of distributing the respective portions of the target data among the at least two backup processes based, at least in part, on an availability of at least one resource in the computer environment used by the at least one backup storage system to access the target data.

Another embodiment of the invention is directed to a computer readable medium encoded with a program for execution on a computer in a computer environment including at least one data storage area and at least one backup data storage system coupled to the at least one data storage area. The backup storage system is configured to execute at least two backup processes in parallel to backup target data stored in the storage area. Each backup process backs up a respective portion of the target data. The program, when executed on the computer, performs a method comprising an act of distributing the respective portions of the target data among the at least two backup processes based, at least in part, on an availability of at least one resource in the computer environment used by the at least one backup storage system to access the target data.

BRIEF DESCRIPTION OF THE DRAWINGS

FIG. 8 is a diagram showing an example of a data file resource information table for one data file of target data to be backed-up, according to one embodiment of the invention;

FIG. 9 is a diagram showing an example of a backup process resource information table for one backup process, according to one embodiment of the invention;

FIG. 10 is a diagram showing an example of a contention penalty table for one data file of the target data, according to one embodiment of the invention;

FIG. 11 is a diagram showing an example of a backup process execution table, according to one embodiment of the invention.

DETAILED DESCRIPTION OF THE INVENTION

Figure 1:
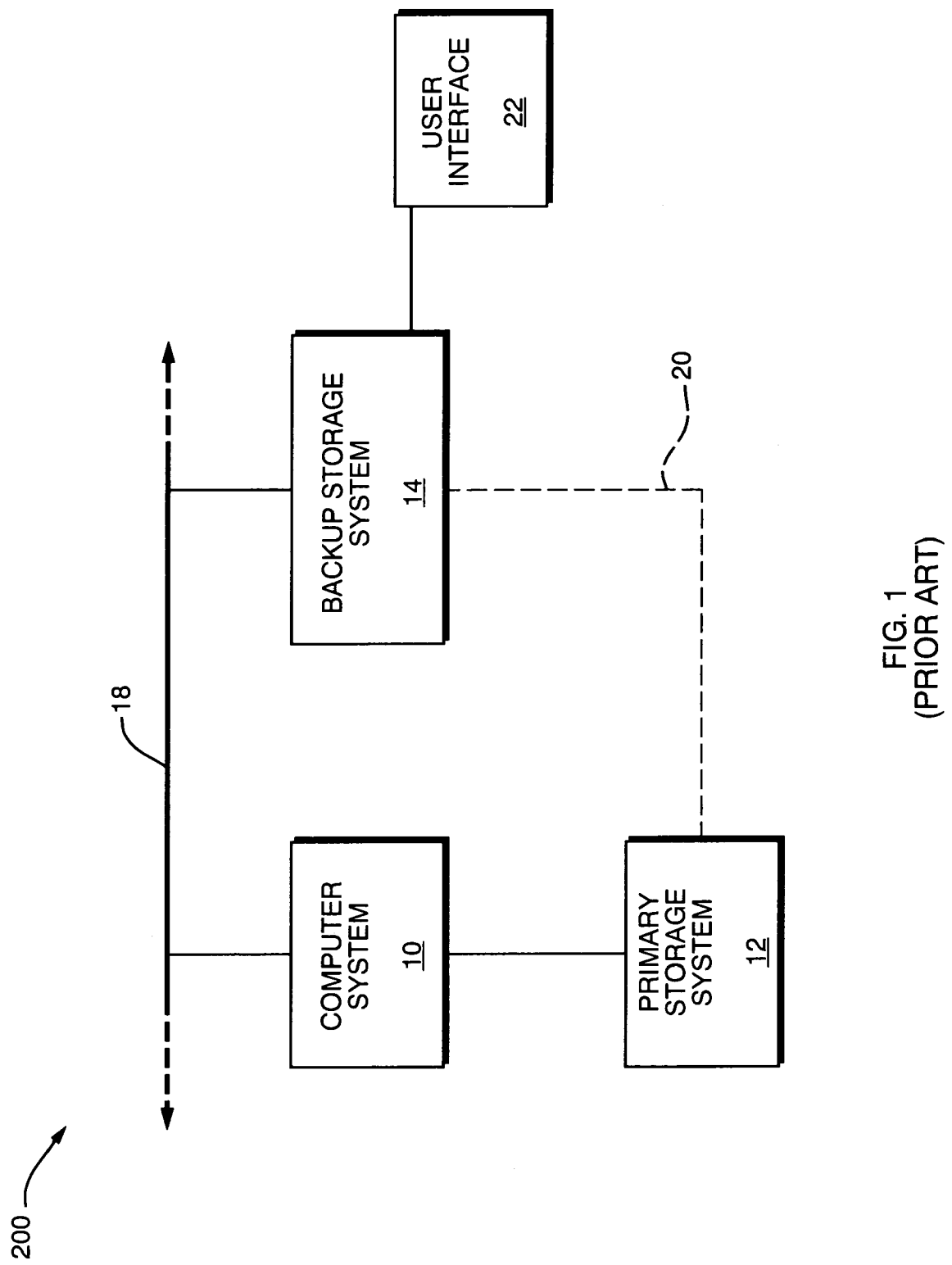
FIG. 1 is a diagram showing a conventional computer environment including a computer system, a primary data storage system, and a backup data storage system.
Figure 2:
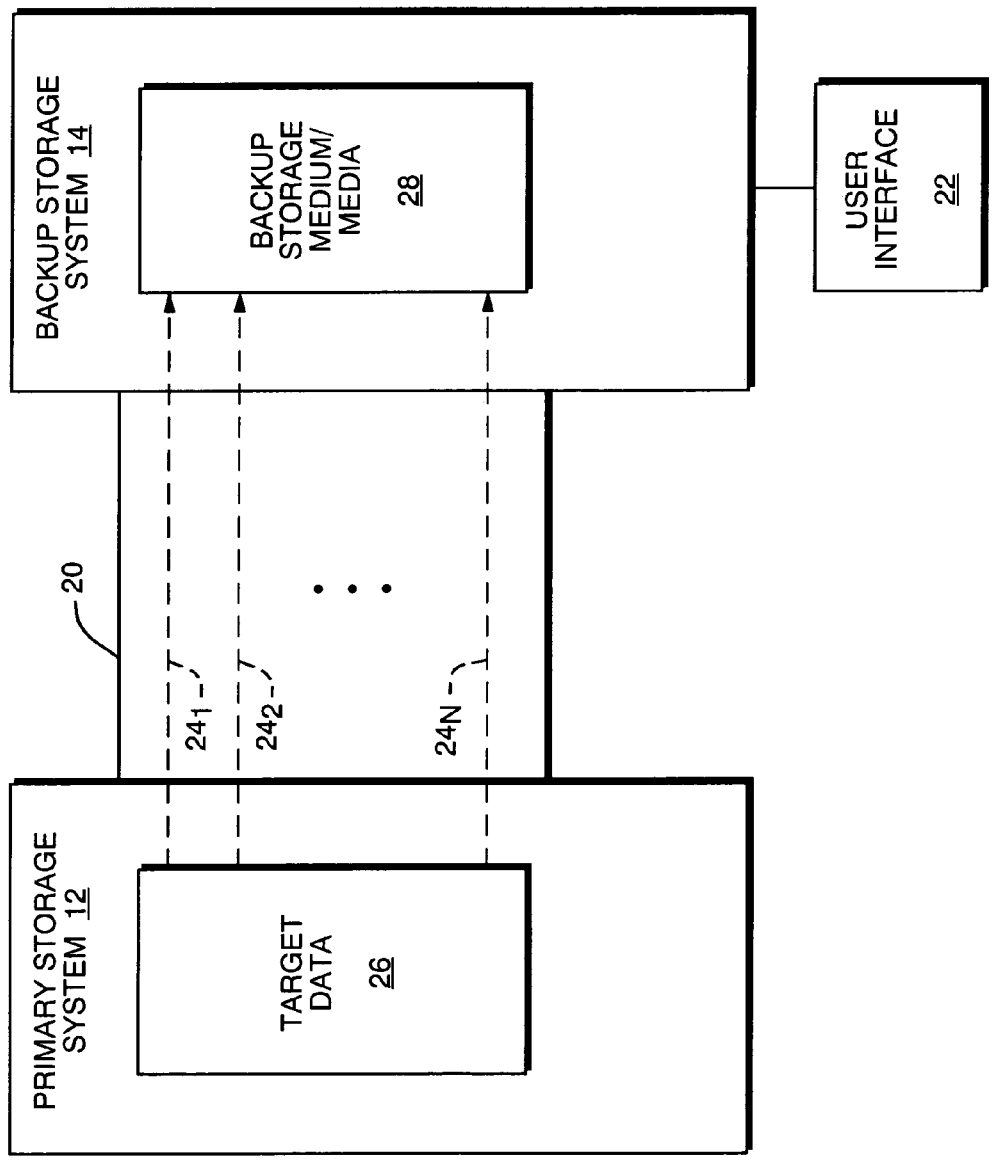
FIG. 2 is a diagram showing the primary storage system and the backup storage system of FIG. 1 in greater detail.

As discussed above in connection with FIG. 2, a conventional backup storage system in a computer environment may perform a data backup operation by executing a number of parallel (i.e., concurrent) backup processes to backup target data that is stored somewhere in the computer environment. For example, FIG. 2 shows that the target data to be backed-up may be stored in one or more primary storage systems dedicated to data storage. Similarly, it should be appreciated that all or a portion of the target data to be backed-up may be stored in one or more computer systems coupled to the backup storage system either via a dedicated (i.e., direct) interface or via a non-dedicated interface such as a network connection, as shown for example in FIG. 1.

In any case, regardless of the original location of the target data, typically the significant factors that determine how the target data is distributed amongst multiple parallel backup processes of a conventional backup storage system during a data backup operation include only the total size of the target data and the number of backup processes used to backup the target data, as discussed above in connection with FIG. 2. In particular, the target data generally is distributed essentially equally amongst the backup processes, such that each backup process backs-up approximately the same amount of data, and such that no data files are broken up amongst different backup processes.

Applicants have appreciated that in the conventional parallel backup process scheme described above, the backup storage system may use a variety of resources in the computer environment to access the target data during a given backup operation. For example, in accessing target data stored in a primary storage system similar to the primary storage system 12 shown in FIG. 3, the backup storage system may require the availability of a particular front end controller $40_1$–$40_N$, a particular disk controller $44_1$–$44_N$, and a particular disk drive $46_1$–$46_N$ at a particular time to access a portion of the target data. Accordingly, the disk drives $46_1$–$46_N$, the disk controllers $44_1$–$44_N$, and the front end controllers $40_1$–$40_N$ are resources of the storage system 12 through which one or more segments of a data file stored in the primary storage system 12 are accessed.

Figure 3:
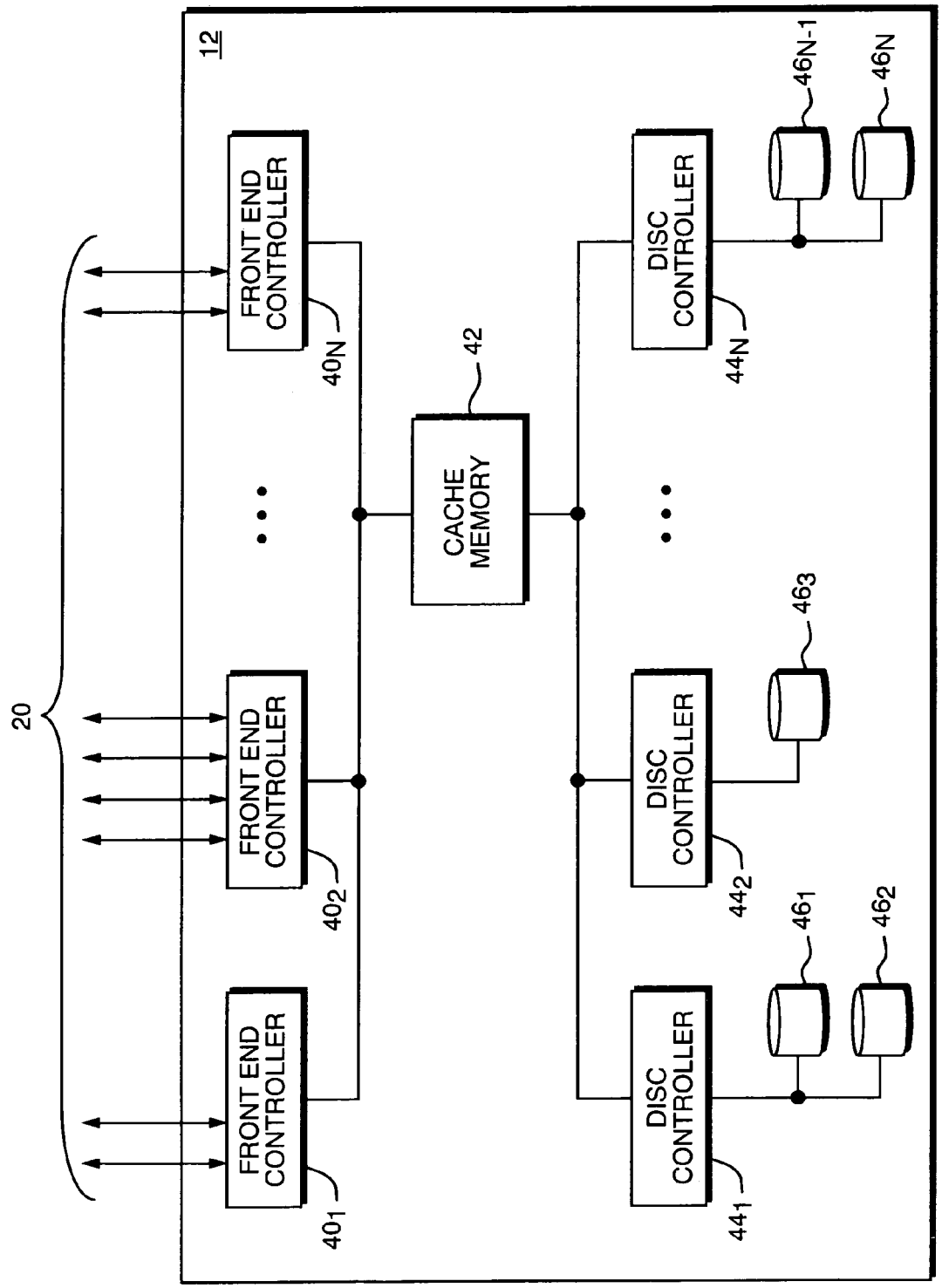
FIG. 3 is a diagram of one example of the primary storage system shown in FIGS. 1 and 2.

Based on the configuration of the primary storage system 12 shown in FIG. 3, namely the allocation of these resources, generally there is a particular access path through the primary storage system 12 to access each segment of a data file. For example, as shown in FIG. 3, disk drive $46_1$ is coupled to disk controller $44_1$. The primary storage system 12 may be configured such that the disk controller $44_1$ transports data to and from the primary storage system 12 via front end controller $40_2$. Accordingly, a segment of a data file stored on the disk drive $46_1$ has an access path that makes use of the combination of resources including the front end controller $40_2$, the disk controller $44_1$, and the disk drive $46_1$. Stated differently, each segment of a data file stored in the primary storage system of FIG. 3 may be identified in terms of the resources utilized to access the segment, which in the foregoing example may include a front end controller identifier, a disk controller identifier, and a disk drive identifier.

Applicants have recognized that, with respect to resources in general, it is possible that two or more backup processes may attempt to access some of the same resources in the computer environment at the same time during a backup operation, resulting in resource contention that reduces the performance of the backup operation. For example, with reference again to the example of a primary storage system shown in FIG. 3, it is possible that at a particular time during a backup operation, two backup process may attempt to access different respective data files that are located on the same disk drive of the primary storage system. Since only one data file may be accessed from the disk drive at any given time, one backup process must wait for the other to access its respective file. For purposes of the present discussion, this situation may be termed "disk drive contention."

In a similar manner, even though two or more different backup processes may be attempting to access data files on different disk drives at a particular time during a backup operation, the primary storage system of FIG. 3 may be configured such that the backup processes must use the same front end controller $40_1$–$40_N$ and/or the same disk controller $44_1$–$44_N$ to get to the different disk drives. Hence, this situation results in one or both of "front end controller contention" and "disk controller contention" between two or more backup processes.

It should be appreciated that the resources identified above in connection with the primary storage system shown in FIG. 3 are for purposes of illustration only; in particular, based on the original location of the target data in the computer environment (e.g., in one or more host computers and/or primary storage systems coupled directly and/or via a network to the backup storage system), the backup storage system may require the availability of a wide variety of resources in the computer environment from time to time to access the target data during a backup operation. These resources similarly may provide for situations involving resource contention. In general, the aspects of the invention discussed further below may be used with any number of different resources and configurations of resources, and are not limited to use with any particular types and/or configurations of resources.

Applicants have recognized that the potential for resource contention may undesirably prolong a backup operation, as one or more backup processes may sit idle waiting for one or more resources to become available. As discussed above, present procedures for executing parallel backup processes typically consider only the size of the target data and the number of backup processes, without regard to the resources that must be used to access the data (e.g., where the data is physically located, what physical and/or logical paths are available to get to the data, etc.). Applicants have realized that by considering the availability of resources used by the backup storage system to access the target data, and distributing the target data amongst the parallel backup processes based at least in part on the availability of these resources at given points in time, resource contention can be reduced during a backup operation, thereby improving the performance of the operation. Stated differently, Applicants have appreciated that by intelligently allocating resources to parallel backup processes so as to minimize contention between the resources, the collection of backup processes that make up the backup operation may be completed in a shorter time.

Accordingly, one embodiment of the present invention is directed to reducing resource contention in parallel data backup processes that share a variety of resources in a computer environment to access target data to be backed-up. In this embodiment, the data to be backed up is distributed among the backup processes based, at least in part, on an availability of one or more resources in the computer environment used by a backup storage system to access the target data.

In one aspect of this embodiment, each data file of the target data is assigned to a particular backup process based on the availability of one or more resources. The data files of the target data are assigned to the backup processes such that each backup process backs-up a respective portion of the target data, and such that the collection of backup processes that make up the backup operation are completed in a shortened time as a result of reduced resource contention.

The present invention, in various embodiments, may be employed to back-up target data located in any number and variety of storage areas, as the invention is not limited to backing up target data from any particular place. For example, the target data originally may be located in one or more host computer systems, one or more primary storage systems, other storage devices, or a combination thereof. Accordingly, for purposes of the following discussion, the original location of the target data is referred to generally as a "storage area," whether this storage area be part of a host computer, primary storage system, or other device in the computer environment containing a storage medium.

It should be appreciated that the embodiments of the invention outlined in further detail below in connection with methods and apparatus for reducing resource contention in parallel data backup processes may be implemented in any of numerous ways, as the invention is not limited to any particular manner of implementation. Examples of specific implementations are provided for illustrative purposes only.

Figure 4:
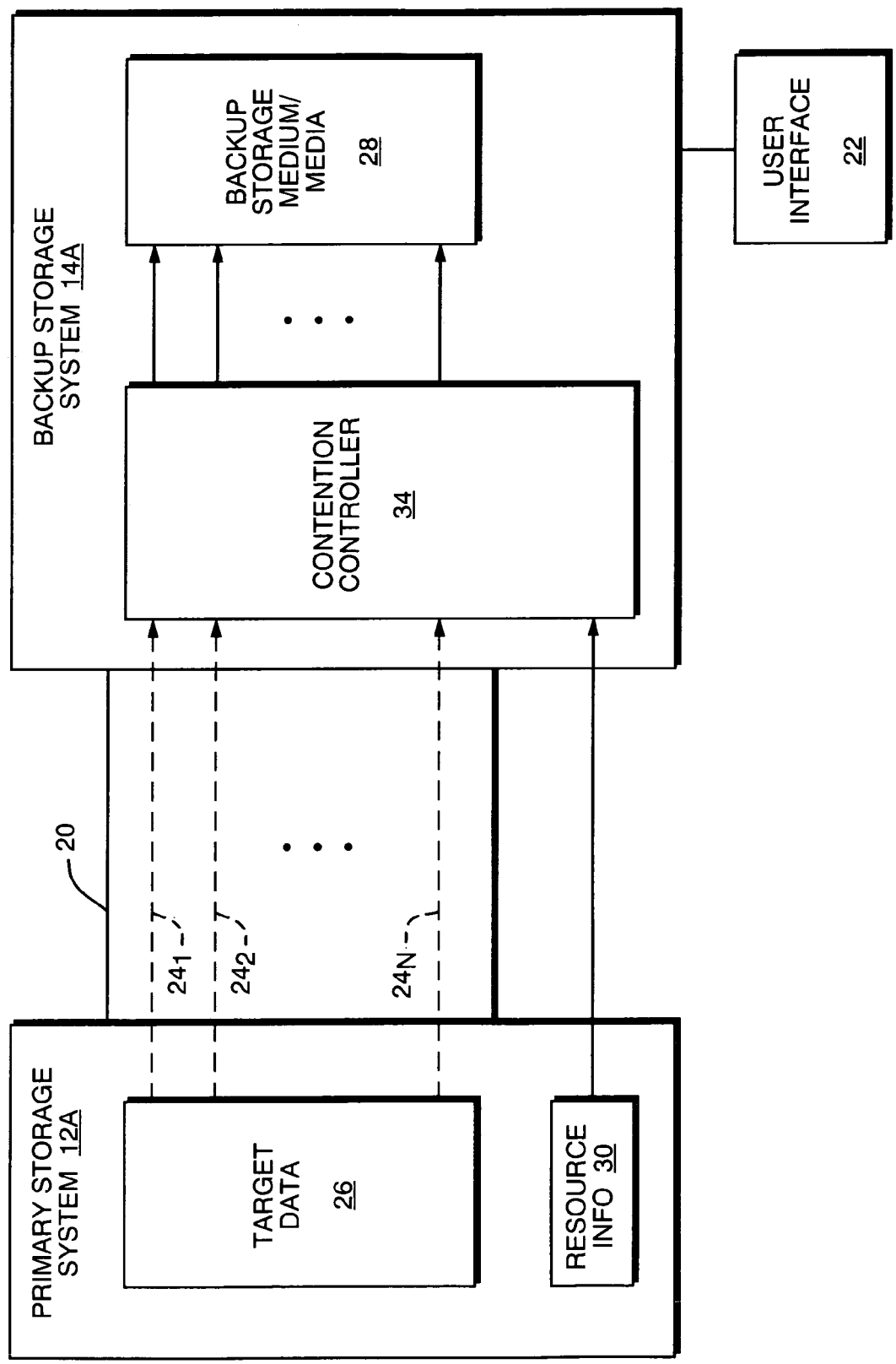
FIG. 4 is a diagram showing a computer environment in which parallel data backup processes are executed based upon available resources in the computer system, according to one embodiment of the invention.

FIG. 4 shows a computer environment similar to that shown in FIG. 2, including a primary storage system 12A, a backup storage system 14A coupled to the primary storage system via one or more dedicated lines 20, and a contention controller 34 according to one embodiment of the invention. The contention controller 34 controls one or more backup processes $24_1$–$24_N$ based at least in part on resource information 30 regarding the availability of one or more resources used by the backup storage system 14A to access the target data 26. In one aspect, the contention controller 34 facilitates an efficient data backup operation, wherein the backup operation as a whole is completed in a shortened time as a result of reduced resource contention.

As shown in the example of FIG. 4, in one embodiment, the contention controller 34 obtains the resource information 30 from the primary storage system 12A in which the target data 26 is stored. However, it should be appreciated that the invention is not limited in this respect, as the backup storage system 14A may backup target data from a variety of data storage areas using a variety of different resources in a variety of different computer environments, as discussed above. Accordingly, for purposes of the invention, information regarding the availability of resources used by the backup storage system 14A to access the target data may be made available to the backup storage system 14A in a variety of ways. Additionally, according to another embodiment of the invention, the backup storage system 14A need not backup target data and/or obtain resource information via the dedicated lines 20, but may do so via a network connection.

Furthermore, although the contention controller 34 is shown in FIG. 4 as being included in the backup storage system 14A for purposes of illustration, it should be appreciated that the invention is not limited in this respect. The contention controller 34 may be implemented using hardware, software, firmware, or a combination of the foregoing. Moreover, rather than being implemented in the backup storage system 14A, the contention controller 34 alternatively may be a stand alone hardware implementation, a software implementation in a dedicated computer or processor (e.g., a server) coupled to the backup storage system 14A, may be included in the primary storage system 12A or one or more host computer systems coupled to the backup storage system (e.g., as shown in FIG. 1), or may be distributed among two or more system components. According to various aspects of the invention, the contention controller 34 generally is coupled to at least the backup storage system 14A and is capable of accessing information regarding the availability of resources in the computer environment used to backup the target data.

Figure 5:
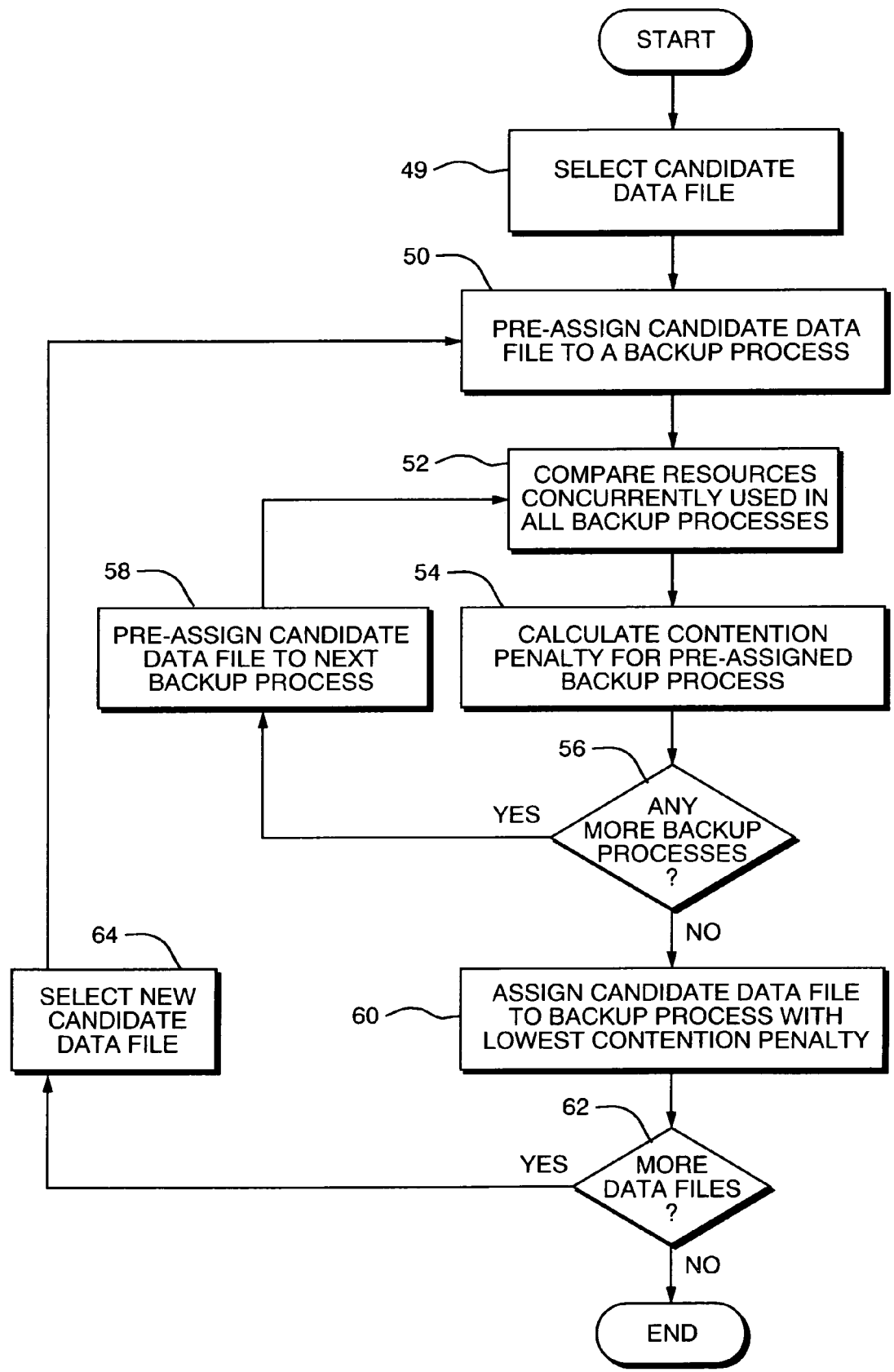
FIG. 5 is a diagram illustrating a flow chart of a method for reducing resource contention amongst parallel data backup processes, according to one embodiment of the invention.

FIG. 5 is a diagram showing a flow chart of a method for reducing resource contention amongst parallel data backup processes, according to one embodiment of the invention. In one aspect of the invention, the contention controller 34 of FIG. 4 implements the method outlined in FIG. 5. In this aspect, according to the method of FIG. 5, the contention controller 34 of FIG. 4 processes each data file of the target data to be backed up, and first pre-assigns the respective data file to each backup process of the backup operation to assess the degree of resource contention that would result from such an assignment. Subsequently, based on an assessment of potential resource contention for each pre-assigned backup process, the contention controller actually assigns each data file to the particular backup process for which the lowest degree of resource contention results.

In particular, according to the method of FIG. 5, in step 49 a first candidate data file of the target data is selected, and in step 50 the candidate data file is pre-assigned to a first backup process of two or more parallel backup processes. In step 52, the method compares the resources that would be used by the first backup process to backup the candidate data file with the resources that concurrently would be used in all other backup processes to backup other data files of the target data previously assigned to these other backup processes. In step 54, a contention penalty is calculated for the candidate data file in the pre-assigned backup process (i.e., the first process in this example) based on any identical resources that concurrently would be used both by the backup process to which the candidate data file is pre-assigned and the other backup processes. It should be appreciated that for a first candidate data file of the target data (i.e., no other data files of the target data previously have been assigned to any of the backup processes), there is no contention penalty.

As shown in steps 56 and 58 of FIG. 5, the method subsequently pre-assigns the candidate data file consecutively to each other backup process of the backup operation, and with each pre-assignment similarly compares resources in step 52 and calculates a contention penalty in step 54 for the candidate data file in the pre-assigned backup process. Once a contention penalty for the candidate data file is obtained for each pre-assigned backup process, the candidate data file is actually assigned to the backup process which resulted in the lowest contention penalty during the pre-assignment procedure, as shown in step 60.

Once the candidate data file is assigned to a particular backup process in step 60, the method of FIG. 5 proceeds through steps 62 and 64 to choose new candidate data files from the target data, and the foregoing pre-assignment and actual assignment procedures are repeated for each new candidate data file until all data files of the target data have been assigned to a particular backup process. In one aspect, as a result of performing the method of FIG. 5, a table or executable file may be compiled, in which is listed an identifier (e.g., a name) for each data file, the backup process to which it is assigned, and its particular order of consideration during the backup process to which it is assigned. One example of such a table is shown for purposes of illustration in FIG. 11, which is discussed in greater detail below. In other aspects, depending on the specific configuration of the backup storage system 14A and the contention controller 34 shown in FIG. 4, the backup storage system or the contention controller may execute such a file (or, for example, consult such a table) to initiate and perform the backup operation.

In the embodiment shown in FIG. 5, each data file of the target data is processed (i.e., pre-assigned to each backup process and actually assigned to one particular backup process) only once by the method to compile, for example, an executable file or table similar to that shown in FIG. 11. As a result, processing time for the method is minimized, which is advantageous when the method is performed as part of the backup operation. However, it should be appreciated that the invention is not limited in this respect. For example, according to another embodiment, the method of FIG. 5 may be iterated a number of times using different orders of consideration for the candidate data files of the target data to compile a number of tables similar to FIG. 11, each having a particular arrangement of target data file assignments among the backup processes. Once a number of such tables are compiled, the method may determine if one particular arrangement of target data file assignments results in a shortest completion time for a backup operation. In this manner, the method of FIG. 5 may be iterated a number of times to optimize the assignment of target data files to backup processes so as to insure a shortest completion time for the backup operation.

In the method of FIG. 5, the data files that make up the target data may be processed in any order. In one embodiment, the candidate data files of the target data are processed in a particular order from largest to smallest. For example, according to this embodiment, in the step 49 of FIG. 5 a first candidate data file having the largest size amongst all of the data files of the target data is selected, and with each iteration of the step 64 a next smaller data file of the target data is selected as the new candidate data file. In this manner, the method according to this embodiment attempts to reduce resource contention amongst those data files of the target data that generally would require the longest time to back-up (due to their relatively larger sizes) by assigning them to backup processes before smaller data files of the target data.

While not shown explicitly in the method of FIG. 5, alternative methods for reducing resource contention according to yet other embodiments (discussed in detail further below) may consider additional factors other than the lowest contention penalty in the actual assignment of the candidate data file to a particular backup process (i.e., in step 60 of FIG. 5). For example, such alternative methods may consider if more than one backup process resulted in the same lowest contention penalty for the candidate file. Additionally, such methods may consider relative sizes of the data previously assigned to each backup process, so as to maintain a balance amongst the data loads of the backup processes; stated differently, such methods may actually assign the candidate data file to a particular backup process based not only on resource contention factors, but based on maintaining approximately similar sizes of the total data assigned to each backup process.

In this respect, it should be appreciated that according to the method of FIG. 5, the backup process resulting in the lowest contention penalty during the pre-assignment procedure generally is the backup process to which the most data previously has been assigned (i.e., the largest backup process). This may be more clearly understood by noting that, at the point at which a candidate data file is pre-assigned to the largest backup process, no other smaller backup processes are using resources because no data files have yet been assigned to them; hence, there is no resource contention. This situation may result in an undesirable imbalance in the data loads among the backup processes.

Accordingly, as discussed above, methods according to other embodiments of the invention may employ various procedures to ensure that data loads among the backup processes are approximately balanced. This may be accomplished in any of numerous ways, as the present invention is not limited to any particular technique. For example, in one embodiment the relative sizes of the total data assigned to each process is considered before assignment of a new candidate data file to a particular process, as discussed above.

Following below is a more detailed discussion of another method for reducing resource contention similar to the method of FIG. 5, according to one embodiment of the invention. In the following discussion, with reference again to FIG. 4, the example of a storage area for the target data 26 is considered to be similarly configured to the primary storage system 12 shown in FIG. 3. Of course, it is to be understood that the invention is not limited to use in backing up target data stored in this particular configuration of a storage area. As discussed above in connection with the exemplary primary storage system of FIG. 3, the target data 26 may be stored on one or more disk drives $46_1$–$46_N$. A variety of access paths through the primary storage system to the disk drives $46_1$–$46_N$ may be determined by the front-end controllers $40_1$–$40_N$ and the disk controllers $44_1$–$44_N$.

Based on the resources used to access target data in this particular example of a primary storage area, Applicants have identified at least three potential sources of resource contention; namely, disk drive contention, disk controller contention, and front-end controller contention, as discussed above. The penalty incurred for contention may not be the same for each resource. For example, Applicants have identified that in a primary storage system similar to that shown in FIG. 3, the penalty incurred for disk drive contention exceeds that for disk controller contention and front-end controller contention. Thus, in one embodiment for use with such systems, priority is given to reducing disk drive contention. It should be appreciated that in other embodiments of the invention, different priorities may be given to different resources depending on various factors that may affect the overall backup operation (e.g., the likelihood that a given resource may contribute to performance degradation).

In view of the foregoing, according to one embodiment, methods and apparatus of the invention take into account both the physical location of the target data 26, as well as the one or more access paths to the physical locations in which the target data is stored, to assess the availability of resources used to access the target data. In particular, according to one embodiment, the contention controller 34 of FIG. 4 (and, similarly, a method for reducing resource contention discussed below in connection with FIGS. 6A and 6B) considers each of the foregoing potential sources of resource contention (i.e., disk drive contention, disk controller contention, and front-end controller contention) to ensure that the total backup operation executes as quickly as possible.

Figure 6A:
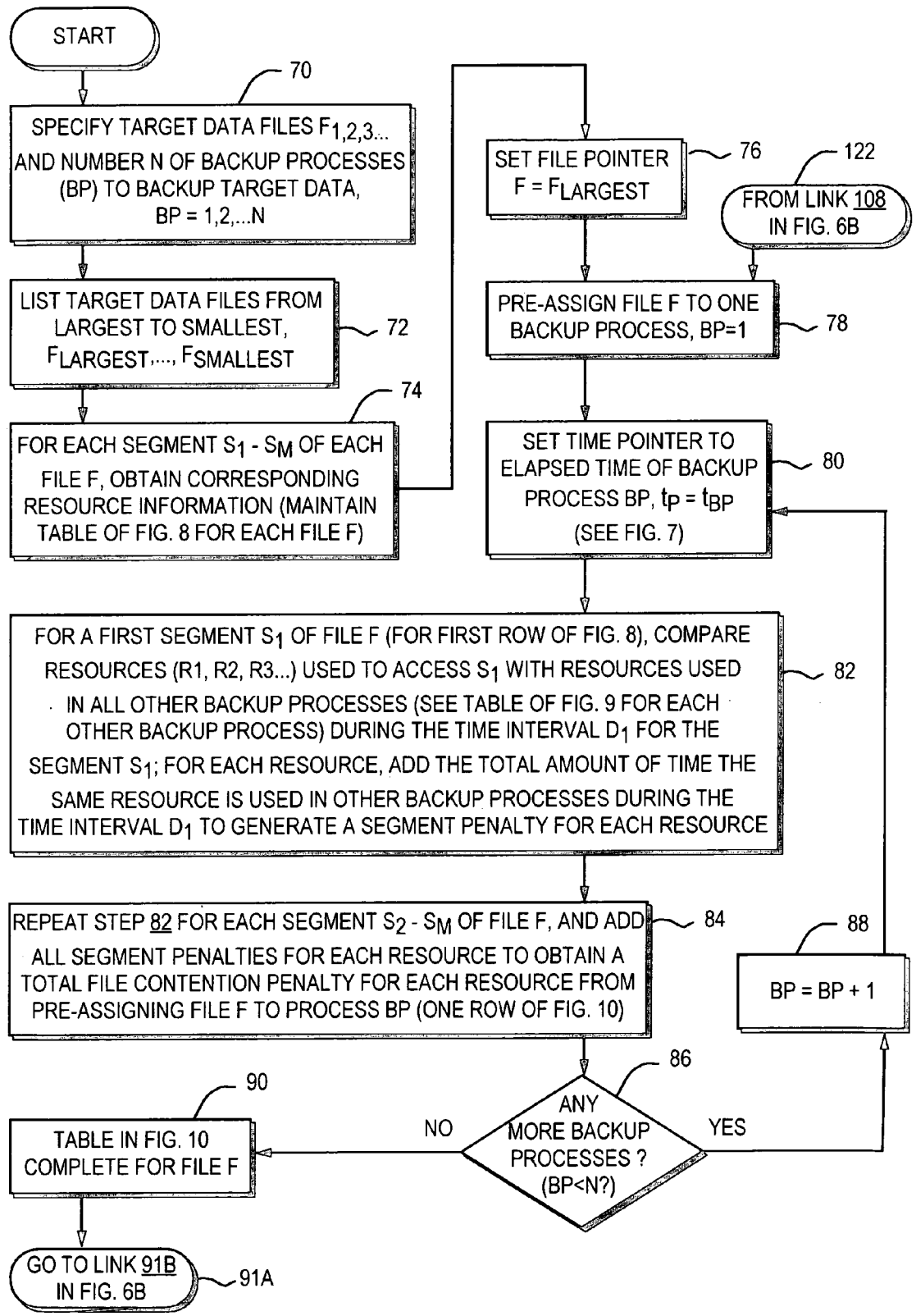
FIGS. 6A and 6B are diagrams illustrating a flow chart of a method for reducing resource contention amongst parallel data backup processes, according to another embodiment of the invention.
Figure 6B:
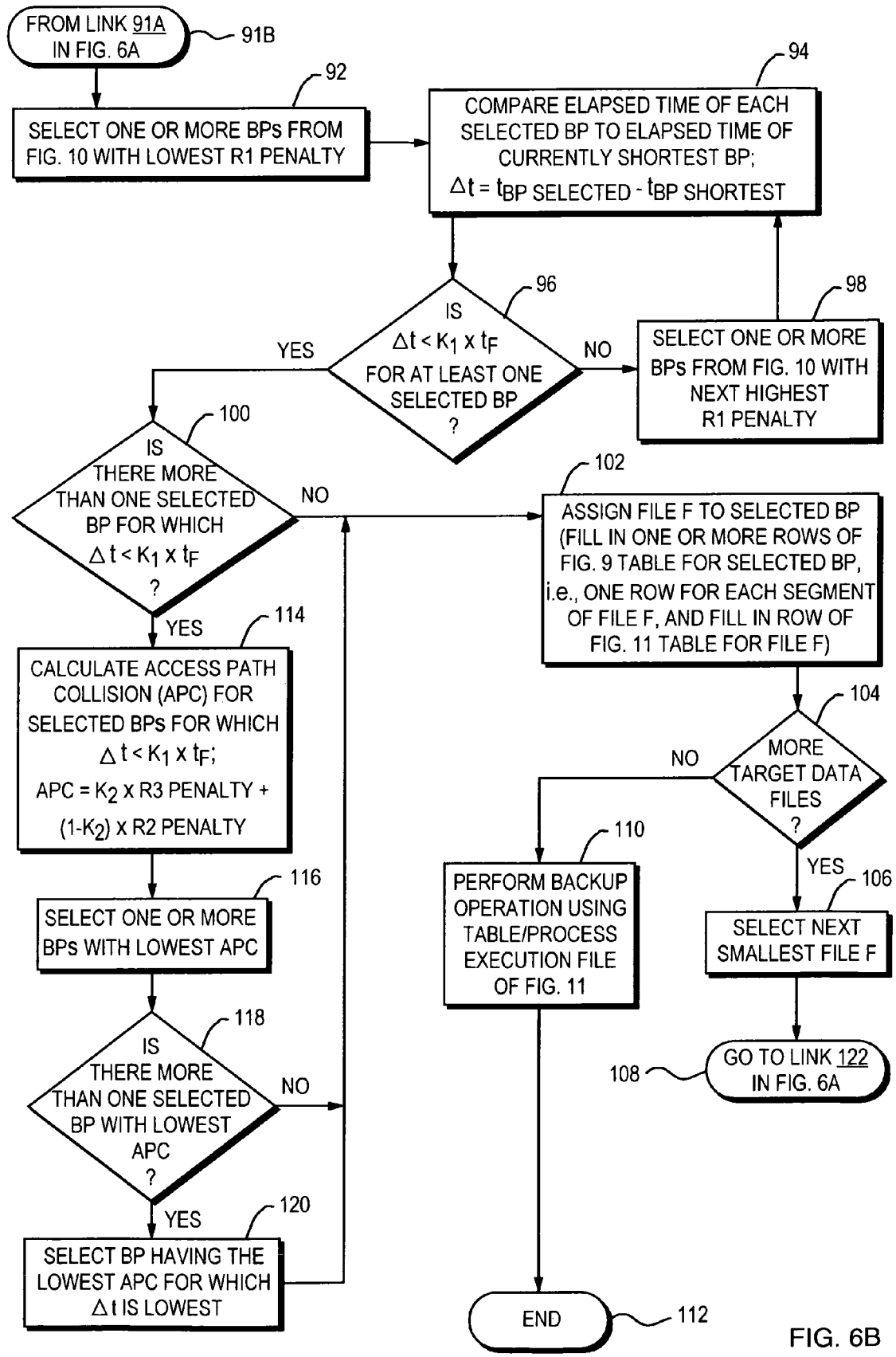

FIGS. 6A and 6B are diagrams illustrating a flow chart of a method for reducing resource contention amongst parallel data backup processes, according to one embodiment of the invention. The method of FIGS. 6A and 6B is similar to the method outlined in FIG. 5, but is explained in more detail and is more tailored to backing up target data that is stored in a primary storage system 12A similar to that shown in FIG. 3. As in the method of FIG. 5, the method of FIGS. 6A and 6B employs a data file pre-assignment and actual assignment procedure which assigns each data file of the target data to a particular backup process based on an availability of resources. In addition, to keep the lengths of the backup processes approximately equal, the method also considers the relative data sizes of each backup process in assigning data files to backup processes. In one aspect, by implementing the method of FIGS. 6A and 6B, the contention controller 34 of FIG. 4 creates a backup process execution table or file (as shown in FIG. 11 and discussed in further detail below) which is executed to control the backup processes of a backup operation performed by the backup storage system 14A.

Figure 7:
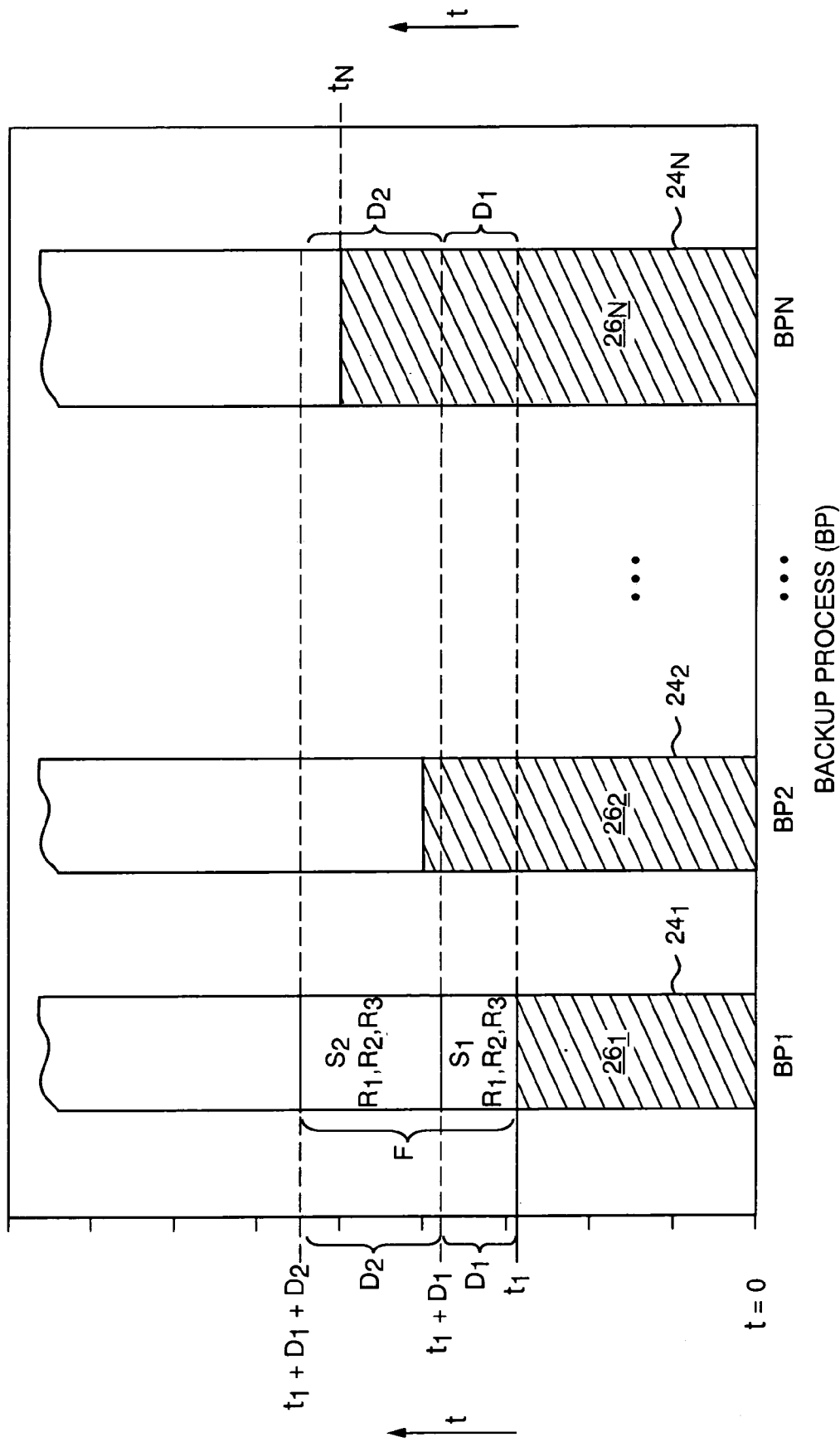
FIG. 7 is a graph illustrating a status of parallel data backup processes during a data file pre-assignment procedure for reducing resource contention, according to one embodiment of the invention.

FIG. 7 is a diagram illustrating a resource allocation of parallel data backup processes as a function of time during a data file pre-assignment procedure for reducing resource contention (e.g., as discussed above in connection with FIG. 5). The graph of FIG. 7 is helpful to explain the method outlined in FIGS. 6A and 6B, and also applies to the method outlined in FIG. 5. In the graph of FIG. 7, the left and right vertical axes represent elapsed time t, and each backup process $24_1$–$24_N$ is symbolically illustrated as a bar graph at a respective position along the horizontal axis, indicated by a backup process (BP) number (i.e., 1, 2, . . . N). For purposes of clarity in the following discussion, the backup processes are referred to as $BP_1$–$BP_N$ rather than by their reference characters $24_1$–$24_N$.

The graph of FIG. 7 essentially represents a "snapshot" view of portions of the target data (in terms of data files) that have been formally assigned to each backup process $BP_1$–$BP_N$ at some point during the data file pre-assignment and actual assignment procedure, as discussed above in connection with FIG. 5 and further below in connection with FIGS. 6A and 6B. In particular, in the graph of FIG. 7, the shaded portions $26_1$–$26_N$ of each bar graph represent data actually assigned to each backup process at the time of the snapshot.

As indicated in FIG. 7, according to one embodiment of the invention, all backup processes $BP_1$–$BP_N$ essentially are initiated (e.g., by the contention controller 34) simultaneously at time t=0. Additionally, according to one embodiment, each backup process is assumed to backup a respective portion of the target data at approximately a same data rate r (e.g., in bits per second, or bps). In this manner, the amount of data $26_1$–$26_N$ assigned to a particular backup process is directly related to an elapsed time for that process by the data rate r. For example, if the data assigned to a particular backup process has a size b (e.g., in bytes), an elapsed time $t_{BP}$ for the backup process may be determined by:

$$t_{BP}(\text{sec}) = b(\text{bytes}) \times 8(\text{bits/byte})/r(\text{bps}).$$

As shown in FIG. 7, at the time of the snapshot, the backup process $BP_1$ has an elapsed time of $t_1$ (as indicated on the left vertical axis) and the backup process $BP_N$ has an elapsed time of $t_N$ (as indicated on the right vertical axis).

With reference again to both FIGS. 4 and 6A, in step 70 of the method according to the embodiment of FIGS. 6A and 6B, a user specifies (e.g., via the user interface 22 shown in FIG. 4) the target data files $F_{1, 2, 3}$, . . . and a number N of backup processes that the backup storage system 14A uses to backup the target data 26 during a backup operation. Once the target data files are specified, information is obtained (e.g., from the primary storage system 12A) regarding a size of each of the data files. According to one aspect of this embodiment, as shown in step 72 of FIG. 6A, based on such information the target data files are arranged in a list, in order from the largest sized file ($F_{largest}$) to the smallest sized file ($F_{smallest}$). By ordering the target data files from largest to smallest, the method of FIGS. 6A and 6B first processes (i.e., pre-assigns and actually assigns) those data files that may be more likely to contribute to significant resource contention due to their relatively larger sizes, and hence, relatively longer backup times (the backup time $t_F$ of a data file is related to its size by the data rate r). It should be appreciated, however, that the invention is not limited in this respect, as the data files $F_{1, 2, 3}$, . . . may be arranged in a variety of different orders.

Each data file F of the target data may comprise a number M of data segments S. In particular, some segments of a given data file may be stored in different physical locations within a storage area, and access to each segment of the file may require the availability of one or more particular resources that create an access path to the segment. More specifically, in the current example, different data segments of a given data file may be located on different disk drives of the primary storage system 12A, which disk drives respectively may be accessed via particular combinations of front-end controllers and disk controllers.

Accordingly, as shown in step 74 of FIG. 6A, resource information identifying those resources that are used to access each segment $S_1$–$S_M$ of each data file F of the target data is collected and assembled in a table, for example, as shown in FIG. 8. It should be appreciated that, according to one embodiment, the method of FIGS. 6A and 6B maintains a table similar to that shown in FIG. 8 for each data file F of the target data.

In the data file resource information table of FIG. 8, each of the rows represents one data segment S of the data file F, and may identify the segment in terms of a time required, or duration D, to back up the segment based on the size of the segment (e.g., in bytes) and the data rate r (e.g., in bps) assumed for each backup process. Accordingly, the duration D of each segment may be calculated in a manner similar to that discussed above in connection with an elapsed time $t_{BP}$ for each backup process, based on data size and data rate. For example, in FIG. 8, the segment $S_1$ is indicated as having a duration $D_1$ =10 ms, and the segment $S_2$ is indicated as having a duration $D_2$=20 ms. Other segments $S_3$–$S_M$ are indicated by the durations $D_3$–$D_M$, respectively. Based on the foregoing, it should be appreciated that a total backup time $t_F$ for the file F may be calculated based on a sum of all of the segment durations $D_1+D_2+ \ldots +D_M$ or, alternatively, from a sum of all of the segment sizes $S_1+S_2+ \ldots +S_M$ multiplied by the data rater.

In the data file resource information table shown in FIG. 8, each column represents a particular resource in the computer environment that may be used to access the segment S of the data file F. In particular, FIG. 8 shows that a first column indicates a first resource identifier $R_1$, which in the current example corresponds to a disk drive identifier. Similarly, a second column indicates a second resource identifier $R_2$, which in the current example corresponds to a disk controller identifier, and a third column indicates a third resource identifier $R_3$, which in the current example corresponds to a front-end controller identifier. It should be appreciated that while three columns are shown in the table of FIG. 8 for this particular example using three resources, the table of FIG. 8 may include any number of columns, each column corresponding to a respective resource in the computer environment used to access the target data.

In the exemplary data file resource information table shown in FIG. 8, for the data segment $S_1$, the disk drive identifier "2" is indicated in the first column to identify one of the disk drives $46_1$–$46_N$ of the primary storage system 12 shown in FIG. 3. Similarly, the disk controller identifier "3" is indicated in the second column to identify one of the disk controllers $44_1$–$44_N$, and the front-end controller identifier "1" is indicated in the third column to identify one of the front-end controllers $40_1$–$40_N$. These identifiers are selected for purposes of illustration only, and a variety of identifiers may be used to identify particular resources in the computer environment. Similarly, for the data segment $S_2$, the disk drive identifier "6" is indicated in the first column to identify one of the disk drives $46_1$–$46_N$ of the primary storage system 12 shown in FIG. 3, the disk controller identifier "2" is indicated in the second column to identify one of the disk controllers $44_1$–$44_N$, and the front-end controller identifier "2" is indicated in the third column to identify one of the front-end controllers $40_1$–$40_N$.

It should be appreciated that the foregoing example of a data file resource information table as shown in FIG. 8 is provided for purposes of illustration only, and that the invention is not limited to this particular example. Other manners of compiling and maintaining data file resource information are possible according to other embodiments of the invention. Additionally, rather than compiling resource information on a file-to-file basis, resource information alternatively may be compiled based on different data units or groupings, as the invention is not limited to compiling and maintaining this information on a file-to-file basis.

Once the method of FIGS. 6A and 6B has assembled a table similar to that shown in FIG. 8 for each data file F of the target data (according to the step 74), the method sets a file pointer to the largest data file $F_{largest}$, as indicated in step 76. As discussed above, it should be appreciated that according to other embodiments, the method initially may set the file pointer to a data file of the target data other than $F_{largest}$, according to a different ordering of the files. After setting the file pointer, the method subsequently initiates a data file pre-assignment procedure, as indicated in step 78. For purposes of the present discussion however, it is more instructive to explain the pre-assignment procedure outlined in FIG. 6A not by starting with the first file processed (e.g., the largest file $F_{largest}$), but rather at a later point during the pre-assignment procedure, after which a number of data files already have been actually assigned to a number of respective backup processes (as shown for example in the "snapshot" graph of FIG. 7). Accordingly, the following discussion describes the pre-assignment procedure of FIG. 6A as if the step 78 were being entered into not from the step 76, but rather from the link 122, at which point a candidate file F other than the first file being processed (e.g., the largest data file $F_{largest}$) and the last file being processed (e.g., the smallest data file $F_{smallest}$) is being considered.

With reference again to FIG. 7, the candidate file F being pre-assigned to the backup process $BP_1$ in the step 78 of FIG. 6A (i.e., BP=1) has two segments $S_1$ and $S_2$, each segment having a respective duration $D_1$ and $D_2$ (i.e., the number of segments M in the candidate file F equals two). It should be appreciated that a candidate file F having only two segments is selected for purposes of illustration only, and that files of the target data may have any number M of data segments S. As discussed above in connection with FIG. 8, each segment $S_1$ and $S_2$ of the candidate file F is accessed via particular resources $R_1$, $R_2$, and $R_3$, which in the present example include a particular disk drive, a particular disk controller, and a particular front-end controller, respectively, of the primary storage system 12A of FIG. 4.

In step 80 of FIG. 6A, a time pointer $t_p$ is set to an elapsed time of the backup process $BP_1$ when the candidate file F is pre-assigned to it, which is indicated as a time $t_1$ on the left vertical axis of FIG. 7. Also indicated on the left vertical axis of FIG. 7 is a time $(t_1+D_1)$, which corresponds to an elapsed time for the backup process $BP_1$ after the segment $S_1$ would be backed up, as well as a time $(t_1+D_1+D_2)$, which corresponds to an elapsed time for the backup process $BP_1$ after the segment $S_2$ (i.e., entire file F) would be backed up.

In step 82 of FIG. 6A, the method compares the resources $R_1$, $R_2$, and $R_3$ used to access the segment $S_1$ of the candidate file F (as indicated in the first row of the table shown in FIG. 8) with resources used in all other backup processes during the time interval between $t_1$ and $(t_1+D_1)$. With reference again to FIG. 7, the interval between $t_1$ and $(t_1+D_1)$ is indicated by two horizontal dashed lines, which identify a corresponding time interval in each of the other backup processes $BP_2$–$BP_N$. During the time interval between $t_1$ and $(t_1+D_1)$, FIG. 7 shows that some data files of the target data previously have been assigned to at least the backup processes $BP_2$ and $BP_N$ (as indicated by the shaded areas $26_2$ and $26_N$, respectively). Accordingly, various resources are utilized by at least the backup processes $BP_2$ and $BP_N$ to access the assigned data files during this interval. Some of these resources may be the same as the resources used to access the segment $S_1$ of candidate file F, resulting in potential resource contention.

According to one aspect of the method of FIGS. 6A and 6B, a backup process resource information table is maintained for each backup process $BP_1$–$BP_N$, an example of which is shown in FIG. 9. As with the table of FIG. 8, it should be appreciated that the table in FIG. 9 is shown for purposes of illustration only, in that other manners of compiling and maintaining backup process resource information are possible, so that the present invention is not limited to any particular compilation technique. The table of FIG. 9 includes one column for each resource, in a manner similar to that of the data file resource information table shown in FIG. 8, and one row for every data segment assigned to the particular backup process. Each row of the table of FIG. 9 indicates an elapsed time, from the start of all of the processes at t=0, in terms of the durations of the respective data segments assigned to the backup process. It should be appreciated in FIG. 9 that the duration notation $D_1$–$D_M$ is used generically to indicate the elapsed time of a process in terms of the durations of the segments assigned to the process, and that the notation in FIG. 9 does not refer to the specific durations $D_1$ and $D_2$ of the particular file segments $S_1$ and $S_2$ of the candidate file F shown in FIG. 7. Accordingly, as illustrated in FIG. 7, the resources used by each backup process $BP_2$–$BP_N$ during the interval between $t_1$ and $(t_1-D_1)$ (corresponding to the pre-assignment of segment $S_1$ of the candidate file F to the backup process $BP_1$) may be identified by examining the corresponding time interval in the table of FIG. 9 for each backup process.

In this manner, in step 82 of FIG. 6A, the method compares the resources indicated in the first row of the table of FIG. 8 for the segment $S_1$ of the candidate file F with the resources used in a row of the table of FIG. 9 corresponding to the time interval between $t_1$ and $(t_1-D_1)$ for each backup process $BP_2$–$BP_N$. For each resource $R_1$, $R_2$, and $R_3$ identified for the segment $S_1$, the method adds the total cumulative amount of time that the resource is used in any of the other backup processes $BP_2$–$BP_N$ during the time interval between $t_1$ and $(t_1+D_1)$ to generate a "segment penalty" (e.g., in an appropriate unit of time such as milliseconds) for the resource. For example, with reference again to FIG. 7, if during the entire time interval between $t_1$ and $(t_1+D_1)$ the backup process $BP_2$ and the backup process $BP_N$ both use the same resources $R_1$, $R_2$, and $R_3$ that are used to access the segment $S_1$, the segment penalty for each resource in units of time would be $2D_1$ (i.e., there would be three segment penalties for the segment $S_1$, one for each resource $R_1$, $R_2$, and $R_3$, and each having a value in units of time of $2D_1$).

As shown in step 84 of FIG. 6A, the step 82 is repeated for each of the segments $S_2$–$S_M$ of the candidate file F (in the current example there is only $S_2$). With reference again to the graph of FIG. 7, during the time interval between $(t_1+D_1)$ and $(t_1+D_1+D_2)$, the backup process $BP_2$ has been actually assigned only a small portion of data, and the backup process $BP_N$ has been actually assigned some data, but not enough to completely fill this interval. Accordingly, the segment penalties for the segment $S_2$ for each resource $R_1$, $R_2$, and $R_3$ likely will be less than the corresponding segment penalties for segment $S_1$ in this example.

As also shown in step 84 of FIG. 6A, after the step 82 has been repeated for each segment $S_2$–$S_M$, the segment penalties for each resource are respectively added together amongst the segments $S_1$–$S_M$ to obtain a total file contention penalty for each resource due to pre-assigning the candidate file F to the process $BP_1$. In one aspect of the method of FIG.

6A, the total file contention penalties for the candidate file F as a function of pre-assigned backup process are compiled in a data file pre-assignment contention penalty table, as shown, for example, in FIG. 10. Hence, at the completion of the step 84 in FIG. 6A, a respective row of the table shown in FIG. 10 is filled in. In the current example, the row for backup process $BP_1$ in a table similar to that shown in FIG. 10 for the candidate file F would be filled in with the respective total contention penalties (in units of time) for the resources $R_1$, $R_2$, and $R_3$ (i.e., disk drive, disk controller, and front-end controller). Again, it should be appreciated that a table similar to that of FIG. 10 is compiled for each data file of the target data. Additionally, it should be appreciated that, as with the tables of FIGS. 8 and 9, the table of FIG. 10 is shown for purposes of illustration only, and that other manners of compiling and maintaining contention penalty information are possible, as the invention is not limited to the particular technique shown.

After the row of resource contention penalties is completed in FIG. 10 for the pre-assignment of the candidate file F to the backup process $BP_1$, step 86 of FIG. 6A queries if there are any more backup processes specified for the backup operation. If so, in step 88, the next backup process is indicated and the method returns to the step 80, at which point the candidate file F is pre-assigned to the next backup process. The steps 82, 84, 86, and 88 are repeated for each remaining backup process, with one row of the table of FIG. 10 being filled in for each pre-assignment of the candidate file F to a respective backup process with each iteration of the step 84. Accordingly, after the candidate file F has been pre-assigned to each backup process, the step 86 passes the method on to step 90 of FIG. 6A, which indicates that the pre-assignment resource contention penalty table of FIG. 10 for the candidate file F is complete. The method then proceeds to the step 92 in FIG. 6B.

In step 92, the method selects one or more backup processes from the table of FIG. 10 for the candidate file F having the lowest contention penalty for the resource $R_1$, which in this example corresponds to a disk drive penalty. As discussed above, for a primary storage system similar to that shown in FIG. 3, disk drive contention is the most significant factor leading to performance degradation of a backup operation employing multiple backup processes. By first seeking to select the one or more backup processes having the lowest disk drive penalty, the method of FIGS. 6A and 6B in some sense "weighs" the importance of disk drive contention by assigning a higher priority to disk drive contention than the other resources. As discussed below, the other resource contention penalties are considered by the method as secondary factors. Accordingly, it should be appreciated that in other embodiments of the invention in which a method similar to that of FIGS. 6A and 6B is implemented with a system having different resources, the available resources in the computer environment used to access target data may be arranged in terms of their priority with respect to performance degradation. In this manner, methods similar to that of FIGS. 6A and 6B according to other embodiments of the invention may be generically applied to any number and variety of resources.

Additionally, it should be appreciated that as a result of the pre-assignment procedure for the candidate file F discussed above, multiple backup processes may tie for having the lowest contention penalty for a given resource. Accordingly, more than one backup process listed in table of FIG. 10 may have the lowest $R_1$ penalty.

Once one or more backup processes having the lowest $R_1$ (e.g., disk drive) penalty are selected in step 92, the method proceeds in the following steps by considering the relative sizes of the data that already has been actually assigned to the respective backup processes (i.e., the respective data loads of the processes). Some of the steps in FIG. 6B illustrate merely one possible technique for considering backup process data loads, and it should be appreciated that the invention is not limited to the specific technique illustrated in FIG. 6B. In general, according to one aspect of the invention, one goal of assigning the data files of the target data to the backup processes in a particular manner is not only to reduce resource contention, but also to keep the respective data loads of the processes approximately equal, so that each process completes backing up its respective portion of the target data in approximately the same amount of time (i.e., one or more processes do not continue to backup well after others have completed backing up data). The invention may accomplish such a goal using a variety of techniques, one of which is shown for example in FIG. 6B and discussed below.

In particular, in step 94 of FIG. 6B, the elapsed time of each selected backup process having the lowest contention penalty for the resource $R_1$ is compared to an elapsed time of the currently shortest backup process. The elapsed time of each selected backup process is measured at the point just before the candidate file F is assigned to the backup process. The difference in elapsed time between each selected backup process and the currently shortest backup process may be expressed as $$\Delta t = t_{BP\ selected} - t_{BP\ shortest}.$$

In step 96, the elapsed time difference $\Delta t$ for each selected backup process is compared to the backup time $t_F$ for the candidate data file F, as given by the expression $$\Delta t < K_1 \times t_F.$$

The effect of step 96 essentially is to maintain relatively balanced loads between the various backup processes of a backup operation. For example, the step 96 essentially asks "if the candidate file F is assigned to one of the selected backup processes having the lowest disk drive penalty, will this selected backup process be substantially longer than the currently shortest backup process?" In order to define what "substantially longer" actually means in terms of time, the constant $K_1$ may be selected to be any value (e.g., between 0 and 1), and may be empirically determined for a particular backup storage system. In one embodiment, the constant $K_1$ is 0.5; hence, in this embodiment, the step 96 tests whether the elapsed time difference $\Delta t$ for each selected backup process is less than /1;2 of the backup time $t_F$ for the candidate file F.

In step 96 of FIG. 6B, if the elapsed time difference $\Delta t$ for at least one of the selected backup processes is not less than the backup time $t_F$ for the candidate file F multiplied by the constant $K_1$, the method proceeds to step 98, in which one or more other backup processes having the next highest $R_1$ (e.g., disk drive) penalty are selected from the table of FIG. 10. The method then returns to the step 94 to again compare the elapsed time of each new selected backup process to the elapsed time of the currently shortest backup process. The method repeats the loop of steps 96, 98, and 94 in FIG. 6B until the query of step 96 is satisfied; namely, until the elapsed time difference $\Delta t$ for at least one selected backup process is less than the backup time $t_F$ for the candidate file F multiplied by the constant $K_1$. When this condition is satisfied, the method proceeds to step 100.

In step 100, the method asks if there is more than one selected backup process which satisfied the query of the step 96. If there is only one selected backup process that satisfied the query, the method proceeds to step 102, where the candidate file F is actually assigned to the selected backup process. As a result of this assignment, one or more rows of the table shown in FIG. 9 for the selected backup process are filled in, each row corresponding to one segment of the candidate file F and identifying the resources used to access the segment. Additionally, one row of the backup process execution table shown in FIG. 11, identifying the candidate data file, is filled in.

In step 104 of FIG. 6B, the method queries if there are more target data files. If not, the method proceeds to step 110, wherein the backup operation is initiated and performed using the backup process execution table shown in FIG. 11, after which the method ends in step 112.

With reference again to the step 104 in FIG. 6B, if there are more target data files after the candidate data file F is assigned to a backup process (e.g., the candidate file F is not $F_{smallest}$ in the embodiment where the target data files are processed in order from largest to smallest), the method proceeds to step 106, in which the next data file (e.g., the next smallest) is selected. The method then returns, via the links 108 (FIG. 6B) and 122 (FIG. 6A), to the step 78, at which point the new (e.g., next smallest) candidate data file is pre-assigned to the first backup process $BP_1$. Thereafter, the method performs the pre-assignment procedure described above for the new candidate data file.

With reference again to the step 100 in FIG. 6B, if more than one selected backup process satisfies the query in the step 96 ($\Delta t < K_1 \times t_F$?), the method proceeds to step 114, which examines the contention penalties corresponding to the other resources $R_2$ (e.g., disk controller) and $R_3$ (e.g., front-end controller) listed in the table of FIG. 10 for each selected backup processes that satisfied the query in the step 96. In particular, as illustrated in step 114, the method calculates an access path collision (APC) penalty for each selected backup process, as given by the expression $$APC = [K_2 \times R_3 \text{ Penalty}] + [(1-K_2) \times R_2 \text{ Penalty}],$$

where the weighing factor $K_2$ may be any value between 0 and 1 and, as with the constant $K_1$, may be empirically determined. In one embodiment, the weighing factor $K_2$ is selected to be 0.5. Hence, in this embodiment, each of the contention penalties for the resources $R_2$ and $R_3$ are "weighed" equally.

In step 116 of FIG. 6B, the method selects the one or more backup process with the lowest access path collision (APC) penalty, and in step 118 asks if there is more than one selected backup process having the lowest APC penalty. If only one backup process has the lowest APC penalty, the method proceeds to step 102, where the candidate file F is assigned to the selected backup process. If, however, more than one backup process has the same APC penalty, in step 120 of FIG. 6B the method selects the one of the backup processes sharing the lowest APC penalty that has the lowest elapsed time difference $\Delta t$ (i.e. the shortest backup process having the lowest APC), after which the method proceeds to step 102, where the candidate file F is assigned to the selected backup process.

It should be appreciated that the use and derivation of the APC penalty discussed above in connection with the step 114 is merely one example of a technique for weighing the relative importance of particular resources, and that the invention is not limited to this particular technique. For example, alternatively, for each selected backup process that satisfies the query in the step 96, methods according to other embodiments of the invention may examine only the $R_2$ penalties (or only the $R_3$ penalties) individually and select the backup process having the lowest individual $R_2$ (or $R_3$) penalty, as opposed to examining an algebraic combination of the $R_2$ and $R_3$ penalties (as is the case for the APC penalty). Furthermore, if two or more backup processes have the same $R_2$ (or $R_3$) penalties, such alternative methods may further examine an individual penalty for yet another resource, and so on.

Additionally, the embodiment of the invention that prioritizes certain resources is not limited to the implementation discussed above, wherein decisions are made based on one resource ($R_1$ in the example above), and then decisions are made for other resources only if there are multiple processes equally efficient based on the highest priority resource. For example, various mathematical combinations (e.g., algebraic relationships) of contention penalties for various resources can be evaluated to select a backup process to which the candidate file F is assigned. In this manner, a number of different weighing factors other than, or in addition to, the factor $K_2$ may be employed to implement a particular weighing scheme for the resources. For example, a particular backup process to which the candidate file F is assigned may be selected based on some criterion for evaluating an expression for an "aggregate" penalty AP having the form $$AP = [K_3 \times R_1 \text{ Penalty}] + [K_4 \times R_2 \text{ Penalty}] + [K_5 \times R_3 \text{ Penalty}] + \ldots,$$

where the weighing factors $K_{3, 4, 5}, \ldots$ each may have a variety of values (e.g., between 0 and 1) to implement a particular weighing or priority scheme for the various resources $R_{1, 2, 3}, \ldots$ In view of the foregoing, it should be appreciated that although the method of FIGS. 6A and 6B is directed to assigning data files to backup processes based on potential contentions between three particular resources (i.e., disk drives, disk controllers, and front-end controllers, as shown in FIG. 3), the method outlined in FIGS. 6A and 6B may be adapted for use with any number and variety of computer environment resources that are used to access target data during a backup operation. In addition, according to various embodiments of the invention discussed above, a method similar to that outlined in FIGS. 6A and 6B enables consideration of resources in a computer environment in terms of their relative significance with respect to potential performance degradation of a backup operation by, for example, prioritizing the resources in order of importance.

Furthermore, as discussed above in connection with the method outlined in FIG. 5, the method of FIGS. 6A and 6B, as well as similar methods according to other embodiments, may be iterated a number of times using different orders of consideration for the candidate data files of the target data to compile a number of tables similar to FIG. 11, each table having a particular arrangement of target data file assignments among the backup processes. Once a number of such tables are compiled, the method may determine if one particular arrangement of target data file assignments results in a shorter completion time for a backup operation than would other arrangements. In this manner, the method of FIGS. 6A and 6B, as well as similar methods, may be iterated a number of times to optimize the assignment of target data files to backup processes so as to insure a shortest completion time for the backup operation.

According to yet another embodiment of the invention, the method of FIGS. 6A and 6B may be adapted to consider the possibility that each of the backup processes $BP_1$–$BP_N$ may not execute at the same data rate r. In practice, since it may not be entirely possible to eliminate resource contention amongst the backup processes $BP_1$–$BP_N$, from time to time the backup processes may not execute at the data rate r due to resource contentions.

Figure 12:
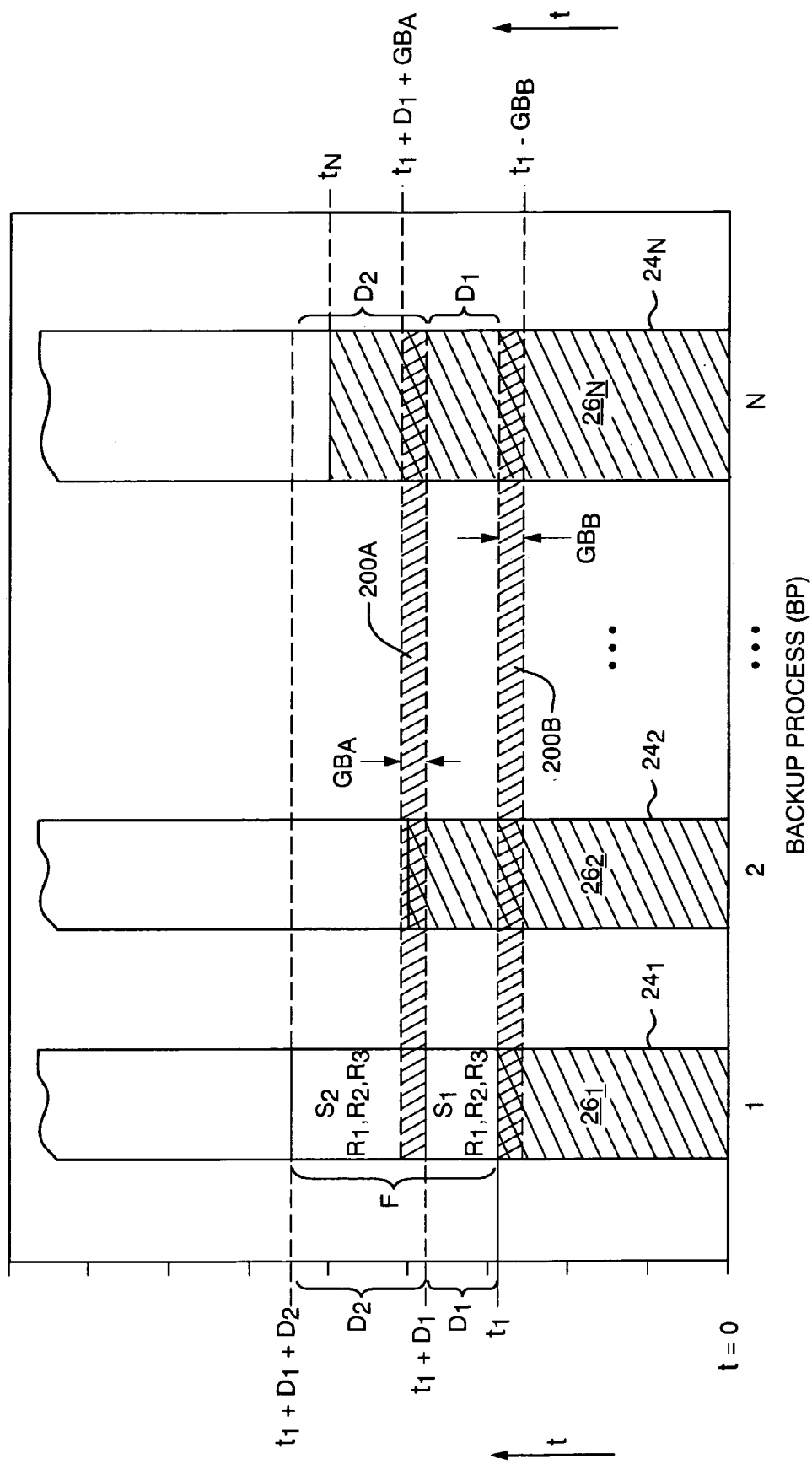
FIG. 12 is a graph illustrating the concept of guard bands for resource contention analysis, according to one embodiment of the invention.

In view of the foregoing, FIG. 12 illustrates an example of a method according to one embodiment of the invention that takes into consideration the possibility of different data rates r amongst the backup processes $BP_1$–$BP_N$. FIG. 12 is a drawing of a graph similar to that shown in FIG. 7, illustrating a "snapshot" view of the backup processes $BP_1$–$BP_N$ at some point during a data file pre-assignment procedure, as discussed above in connection with FIG. 5 and FIGS. 6A and 6B. In particular, FIG. 12 illustrates two "guard bands" 200A and 200B respectively positioned above and below the segment $S_1$ of the candidate file F which is pre-assigned to the backup process $BP_1$. FIG. 12 also shows that each of the guard bands 200A and 200B has a respective duration $GB_A$ and $GB_B$.

According to one aspect of this embodiment, the durations $GB_A$ and $GB_B$ of the guard bands 200A and 200B are related to the duration $D_1$ of the segment $S_1$. For example, each of the durations $GB_A$ and $GB_B$ may be approximately 10% of the duration $D_1$. It should be appreciated, however, that the foregoing example of guard band durations is for purposes of illustration only, and that the respective durations $GB_A$ and $GB_B$ of the guard bands 200A and 200B may be the same or different and, may have a variety of values which may or may not be related to the duration $D_1$ of the segment $S_1$.

According to this embodiment, the step 82 in the method of FIGS. 6A and 6B (shown particularly in FIG. 6A) is modified such that for each segment of a candidate data file F, any resources ($R_1$, $R_2$, $R_3$ ...) used to access the segment are compared with resources used in all other backup processes during a time interval defined by the duration of the segment plus an additional time interval corresponding to at least one, if not two, guard bands (e.g., one preceding and one following each segment). In particular, FIG. 12 shows that the guard band 200B precedes the segment $S_1$ and the guard band 200A follows the segment $S_1$ for the candidate data file F. In this example, resources are compared amongst the backup processes $BP_1$–$BP_N$ for the segment $S_1$ during the time interval between $(t_1 - GB_B)$ to $(t_1 + D_1 + GB_A)$, as indicated on the right vertical axis of FIG. 12. By comparing resources during a time interval that is longer than the actual duration of the segment under consideration, the method adds an extra measure of security against variations in data rate r amongst the backup processes $BP_1$–$BP_N$ that may lead to inaccurate resource contention determinations if a constant data rate r is assumed for each backup process.

As discussed above, the guard band durations $GB_B$ and $GB_A$ shown in FIG. 12 may have a number of values and may be empirically determined for a particular backup storage system. Additionally, while FIG. 12 illustrates guard bands preceding and following the segment $S_1$ of the candidate file F, it should be appreciated that similar guard bands may be identified for the segment $S_2$ of the candidate file F. Furthermore, as discussed above, the concept of guard bands may be extended to any segment $S_1$–$S_M$ of any candidate file F under consideration.

The use of guard bands as shown in FIG. 12 to account for potential differences in the actual execution rates of the backup processes reduces processing time when employed, for example, with the methods outlined in FIG. 5 and FIGS. 6A and 6B. This reduced processing time is advantageous when these methods are performed as part of the backup operation. However, it should be appreciated that the invention is not limited in this respect, as other techniques according to the present invention may be used to account for potential differences in the actual execution rates of the backup processes. For example, according to one embodiment, one or more contention penalties calculated for a particular backup process during the pre-assignment procedure of either of the methods outlined in FIG. 5 and FIGS. 6A and 6B may be added to the elapsed time of a particular backup process to which a candidate file is actually assigned, to account for resource contention. Similarly, any contention that results in other backup processes as a result of the actual assignment of the candidate file to the particular backup file may be accounted for in the other backup processes (i.e., contention times may be added to the elapsed times of the other processes). In this manner, the elapsed time of each backup process would reflect any contentions for resources amongst the backup processes that would result during the backup operation.

As discussed above in connection with FIG. 4, it should be appreciated that the contention controller 34 that performs the above-described aspects of the present invention can be in a backup storage system or elsewhere in a computer system, and can be implemented in numerous ways, such as with dedicated hardware, or using a processor that is programmed using microcode or software to perform the functions recited above. In this respect, it should be appreciated that one embodiment of the invention is directed to a computer readable medium (e.g., a computer memory, a floppy disk, a compact disk, a tape, etc.) encoded with a computer program that, when executed on a computer or other processor, performs methods that implement the various embodiments of the invention discussed above. The computer readable medium can be transportable, such that the program stored thereon can be loaded onto one or more different computer systems to implement various aspects of the present invention as discussed above. It should be understood that the term "computer program" is used herein in a generic sense to reference any type of computer code that can be employed to program a computer or other processor to implement various aspects of the present invention as discussed above.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. In a computer environment including at least one data storage area and at least one backup data storage system coupled to the at least one data storage area, the at least one backup storage system configured to execute at least two backup processes in parallel to backup target data stored in the at least one storage area, each backup process to back up a respective portion of the target data, an apparatus comprising:

at least one contention controller, coupled to the at least one backup storage system, that distributes the respective portions of the target data among the at least two backup processes based, at least in part, on an availability of at least one resource in the computer environment used by the at least one backup storage system to access the target data, wherein each backup process is capable of using the at least one resource, and wherein the at least one contention controller distributes the respective portions of the target data among the at least two backup processes so as to reduce a contention for the at least one resource between the at least two backup processes, wherein the at least two backup processes include N backup processes, and wherein the at least one contention controller pre-assigns a first portion of the target data to a first backup process of the N backup processes, wherein the first portion is to be backed up during a first time period when the N backup processes are executed, and wherein the at least one contention controller makes at least one comparison of contention for at least one first resource used to access the first portion between the first backup process and at least one other backup process of the N backup processes during the first time period, and generates at least one contention penalty for the first backup process based on the at least one comparison.

2. The apparatus of claim 1, wherein after the at least one contention controller generates the at least one contention penalty for the first backup process, the at least one contention controller further pre-assigns the first portion to a second backup process of the N backup processes, the at least one contention controller making at least one comparison of contention for the at least one first resource used to access the first portion between the second backup process and at least one other backup process of the N backup processes during the first time period and generating at least one contention penalty for the second backup process based on the at least one comparison.

3. The apparatus of claim 2, wherein the at least one contention controller assigns the first portion of the target data to a particular one of the first backup process and the second backup process having the lowest at least one contention penalty.

4. The apparatus of claim 2, wherein the at least one contention controller further consecutively pre-assigns the first portion to each remaining backup process of the N backup processes until at least one contention penalty is generated for each backup process of the N backup processes.

5. The apparatus of claim 4, wherein the at least one contention controller assigns the first portion to a particular backup process of the N backup processes having the lowest at least one contention penalty.

6. The apparatus of claim 4, wherein the at least one contention controller assigns the first portion to a particular backup process of the N backup processes based on at least one of the at least one contention penalty for each backup process and an amount of the target data already assigned to each backup process.

7. The apparatus of claim 6, wherein the at least one contention controller makes a second comparison of a first elapsed time of each backup process having the lowest at least one contention penalty and a second elapsed time of a shortest backup process of the N backup processes, the at least one contention controller assigning the first portion to the particular backup process based, at least in part, on the second comparison.

8. The apparatus of claim 7, wherein the at least one first resource includes a plurality of resources, and wherein the at least one contention controller prioritizes the plurality of resources differently.

9. The apparatus of claim 6, wherein the at least one contention controller pre-assigns each respective portion of the target data to each backup process of the N backup processes to generate at least one contention penalty for each respective portion in each respective process, and assigns each respective portion to a respective particular backup process of the N backup processes based on at least one of the at least one contention penalty for each respective portion in each backup process and an amount of data already assigned to each backup process.

10. In a computer environment including at least one data storage area and at least one backup data storage system coupled to the at least one data storage area, the at least one backup storage system configured to execute at least two backup processes in parallel to backup target data stored in the at least one storage area, each backup process to back up a respective portion of the target data, an apparatus comprising:

at least one contention controller, coupled to the at least one backup storage system, that distributes the respective portions of the target data among the at least two backup processes based, at least in part, on an availability of at least one resource in the computer environment used by the at least one backup storage system to access the target data, wherein each backup process is capable of using the at least one resource, and wherein the at least one contention controller distributes the respective portions of the target data among the at least two backup processes so as to reduce a contention for the at least one resource between the at least two backup processes and wherein the at least two backup processes include N backup processes, and wherein the at least one contention controller pre-assigns a first portion of the target data to a first backup process of the N backup processes, wherein the first portion is to be backed up during a first time period when the N backup processes are executed, and wherein the at least one contention controller makes at least one comparison of the contention for at least one first resource used to access the first portion between the first backup process and at least one other backup process of the N backup processes during a comparison time period that includes at least one guard band time period added to the first time period.

11. In a computer environment including at least one data storage area and at least one backup data storage system coupled to the at least one data storage area, the at least one backup storage system configured to execute at least two backup processes in parallel to backup target data stored in the at least one storage area, each backup process to back up a respective portion of the target data, a method comprising an act of:

a) distributing the respective portions of the target data among the at least two backup processes based, at least in part, on an availability of at least one resource in the computer environment used by the at least one backup storage system to access the target data wherein the at least two backup processes include N backup processes, and wherein the act a) includes acts of:

b) pre-assigning a first portion of the target data to a first backup process of the N backup processes, the first portion to be backed up during a first time period when the N backup processes are executed;

c) making at least one comparison of contention for at least one first resource used to access the first portion between the first backup process and at least one other backup process of the N backup processes during the first time period; and d) generating at least one contention penalty for the first backup process based on the at least one comparison.

12. The method of claim 11, further including acts of:
e) pre-assigning the first portion to a second backup process of the N backup processes;
f) making at least one comparison of contention for the at least one first resource used to access the first portion between the second backup process and at least one other backup process of the N backup processes during the first time period; and
g) generating at least one contention penalty for the second backup process based on the at least one comparison.

13. The method of claim 12, further including an act of:
h) assigning the first portion of the target data to a particular one of the first backup process and the second backup process having the lowest at least one contention penalty.

14. The method of claim 12, further including acts of:
h) pre-assigning the first portion to another backup process of the N backup processes;
i) making at least one comparison of contention for the at least one first resource used to access the first portion between the other backup process and at least one backup process different from the other backup process during the first time period;
j) generating at least one contention penalty for the other backup process based on the at least one comparison; and
k) repeating acts h), i), and j) until at least one contention penalty is generated for each backup process of the N backup processes.

15. The method of claim 14, further including an act of:
l) assigning the first portion to a particular backup process of the N backup processes having the lowest at least one contention penalty.

16. The method of claim 14, further including an act of:
l) assigning the first portion to a particular backup process of the N backup processes based which of the N backup processes have the lowest at least one contention penalty and an amount of data already assigned to each of the N backup processes.

17. The method of claim 14, wherein the at least one first resource includes a plurality of resources, and wherein the method further includes an act of:
k) differently prioritizing the plurality of resources.

18. A computer readable medium encoded with a program for execution on a computer in a computer environment including at least one data storage area and at least one backup data storage system coupled to the at least one data storage area, the at least one backup storage system configured to execute at least two backup processes in parallel to backup target data stored in the at least one storage area, each backup process to back up a respective portion of the target data, the program, when executed on the computer, performing a method comprising an act of:
a) distributing the respective portions of the target data among the at least two backup processes based, at least in part, on an availability of at least one resource in the computer environment used by the at least one backup storage system to access the target data, wherein the at least two backup processes includes N backup processes, and wherein the act a) includes acts of:

b) pre-assigning a first portion of the target data to a first backup process of the N backup processes, the first portion to be backed up during a first time period when the N backup processes are executed;
c) making at least one comparison of contention for at least one first resource used to access the first portion between the first backup process and at least one other backup process of the N backup processes during the first time period; and
d) generating at least one contention penalty for the first backup process based on the at least one comparison.

19. The computer readable medium of claim 18, wherein the method further includes acts of:
e) pre-assigning the first portion to a second backup process of the N backup processes;
f) making at least one comparison of contention for the at least one first resource used to access the first portion between the second backup process and at least one other backup process of the N backup processes during the first time period; and
g) generating at least one contention penalty for the second backup process based on the at least one comparison.

20. The computer readable medium of claim 19, wherein the method further includes an act of:
h) assigning the first portion of the target data to a particular one of the first backup process and the second backup process having the lowest at least one contention penalty.

21. The computer readable medium of claim 19, wherein the method further includes acts of:
h) pre-assigning the first portion to another backup process of the N backup processes;
i) making at least one comparison of contention for the at least one first resource used to access the first portion between the other backup process and at least one backup process different from the other backup process during the first time period;
j) generating at least one contention penalty for the other backup process based on the at least one comparison; and
k) repeating acts h), i), and j) until at least one contention penalty is generated for each backup process of the N backup processes.

22. The computer readable medium of claim 21, wherein the method further includes an act of:
l) assigning the first portion to a particular backup process of the N backup processes having the lowest at least one contention penalty.

23. The computer readable medium of claim 21, wherein the method further includes an act of:
l) assigning the first portion to a particular backup process of the N backup processes based on at least one of the at least one contention penalty for each backup process and an amount of data already assigned to each backup process.

24. The computer readable medium of claim 23, wherein the at least one first resource includes a plurality of resources, and wherein the method further includes an act of:
k) differently prioritizing the plurality of resources.

* * * * *